US009027545B2

(12) United States Patent
DeVillier

(10) Patent No.: US 9,027,545 B2
(45) Date of Patent: May 12, 2015

(54) SOLAR COLLECTOR POSITIONING APPARATUS

(76) Inventor: William J. DeVillier, Brusly, LA (US)

(*) Notice: Subject to any disclaimer, the term of this patent is extended or adjusted under 35 U.S.C. 154(b) by 693 days.

(21) Appl. No.: 13/302,647

(22) Filed: Nov. 22, 2011

(65) Prior Publication Data

US 2012/0125401 A1 May 24, 2012

Related U.S. Application Data

(60) Provisional application No. 61/417,086, filed on Nov. 24, 2010.

(51) Int. Cl.
*F24J 2/54* (2006.01)
*F24J 2/38* (2014.01)
*F24J 2/52* (2006.01)
*H01L 31/042* (2014.01)
*F24J 2/00* (2014.01)

(52) U.S. Cl.
CPC ............... *F24J 2/5424* (2013.01); *Y02E 10/50* (2013.01); *Y02E 10/47* (2013.01); *F24J 2/38* (2013.01); *F24J 2/5233* (2013.01); *F24J 2002/0084* (2013.01); *F24J 2002/5451* (2013.01); *H02S 20/00* (2013.01)

(58) Field of Classification Search
CPC ............ Y02E 10/47; F24J 2/54; F24J 2/5431; F24J 2/5403; F24J 2/52; F24J 2/5239; F24J 2/5269; F24J 2/5427
USPC .................... 126/600, 696, 700; 136/246, 248
See application file for complete search history.

(56) References Cited

U.S. PATENT DOCUMENTS

| 4,153,038 | A | 5/1979 | McDonald |
| 4,172,739 | A | 10/1979 | Tassen |
| 4,215,410 | A | 7/1980 | Weslow et al. |
| 4,295,621 | A | 10/1981 | Siryj |

(Continued)

FOREIGN PATENT DOCUMENTS

| EP | 2136156 A2 | 6/2009 |
| EP | 2136156 | 12/2009 |

(Continued)

OTHER PUBLICATIONS

Patent Cooperation Treaty—International Search Report and Written Opinion. PCT/US2011/061831, Apr. 5, 2012, pp. 1-13, USA. International Filing Date—Nov. 22, 2011. Priority Date Nov. 24, 2010. Applicant's Name—William DeVillier.

(Continued)

*Primary Examiner* — Avinash Savani
(74) *Attorney, Agent, or Firm* — Jones Walker LLP

(57) ABSTRACT

A solar collector positioning apparatus including a base structure and an intermediate frame connected to the base structure by at least two base support legs. The base support legs have a hinged connection to the base structure and a hinged connection to the intermediate frame, thereby constraining the movement of the intermediate frame to a plane substantially orthogonal to a plane occupied by the base structure. A solar collector support frame is connected to the intermediate frame by at least two intermediate support legs. The intermediate support legs have a hinged connection to the solar collector support frame and a hinged connection to the intermediate frame, thereby constraining the movement of the solar collector support frame to a plane substantially orthogonal to a plane occupied by the intermediate frame.

22 Claims, 19 Drawing Sheets

(56) References Cited

U.S. PATENT DOCUMENTS

| | | | |
|---|---|---|---|
| 4,404,465 A | 9/1983 | Miller | |
| 4,585,318 A | 4/1986 | Seifert | |
| 4,832,002 A | 5/1989 | Medina | |
| 5,022,929 A * | 6/1991 | Gallois-Montbrun | 136/246 |
| 5,195,504 A * | 3/1993 | Lane | 126/682 |
| 6,058,930 A | 5/2000 | Shingleton | |
| 6,552,257 B1 | 4/2003 | Hart et al. | |
| 7,134,531 B2 | 11/2006 | Ramey et al. | |
| 7,513,250 B2 * | 4/2009 | Head et al. | 126/605 |
| 7,898,212 B2 * | 3/2011 | Benn et al. | 320/101 |
| 8,469,022 B2 * | 6/2013 | Cowan et al. | 126/605 |
| 2004/0244525 A1 | 12/2004 | Gaechter | |
| 2007/0277868 A1 | 12/2007 | Huang et al. | |
| 2009/0235975 A1 | 9/2009 | Shingleton | |
| 2010/0139647 A1 | 6/2010 | Mata | |
| 2010/0175685 A1 | 7/2010 | Campbell | |
| 2011/0023864 A1 * | 2/2011 | Andretich | 126/570 |

FOREIGN PATENT DOCUMENTS

| | | |
|---|---|---|
| KR | 100900210 B1 | 6/2009 |
| WO | 2005040694 | 5/2005 |
| WO | 2005040694 A1 | 5/2005 |
| WO | 2008090241 | 7/2008 |
| WO | 2010039999 | 4/2010 |
| WO | 2010039999 A2 | 4/2010 |

OTHER PUBLICATIONS

Energia Ercam, S.A.. Grupo Ercam—2 Axis Ercam H-H1 Solar Tracker System. SGS. Jan. 2007. pp. 1-15.

International Preliminary Report on Patentability—PCT/US2011/061831; International Bureau; Jun. 6, 2013; pp. 1-10.

Examination Notification issued in Tawiwan Patent Application No. 10111325 on Dec. 10, 2014.

Examination Notification issued in Chinese Patent Application No. 2011800658097 on Jan. 22, 2015.

* cited by examiner

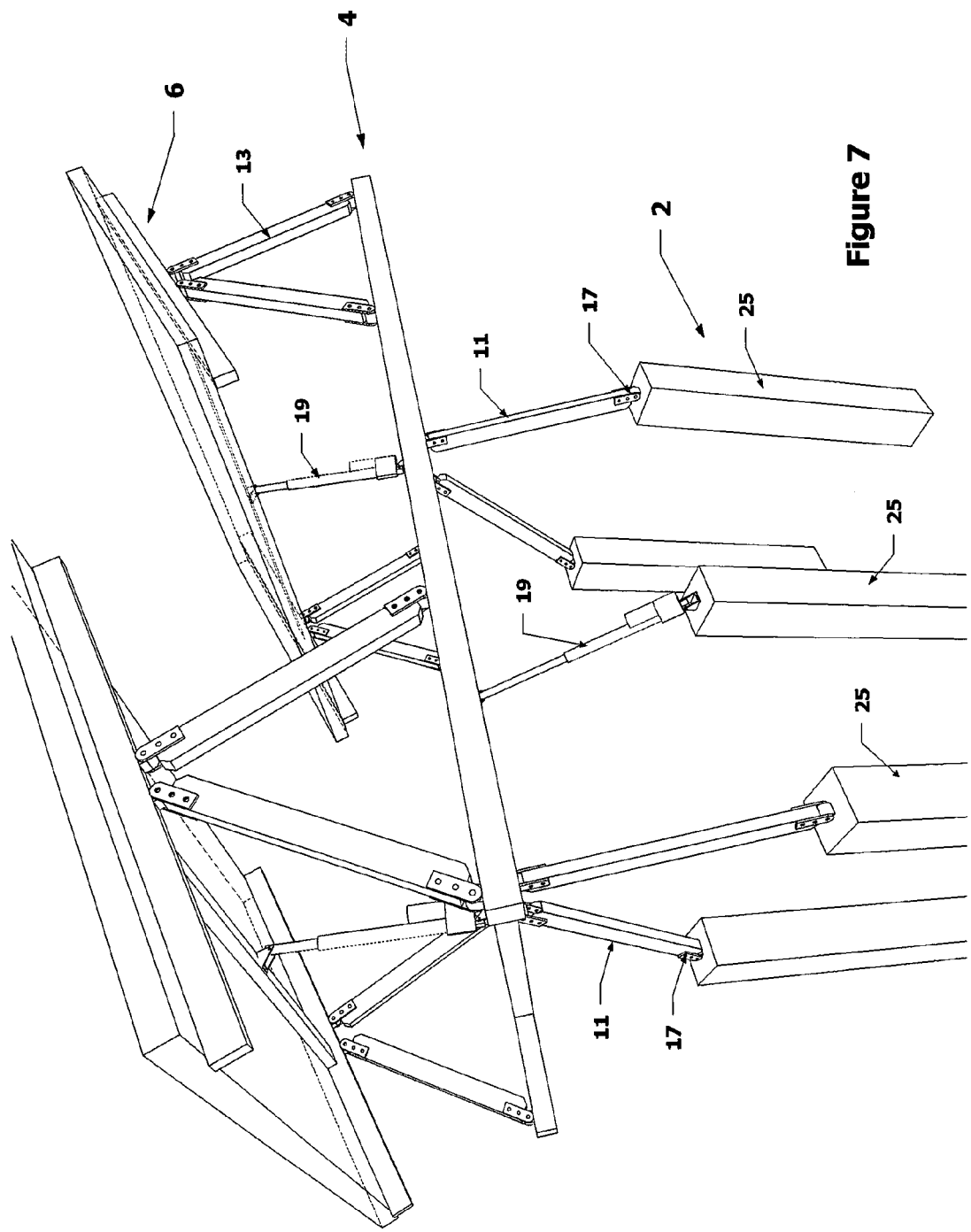

Chebychev Linkage Actuator with 4-Bar Linkage Support

East West Collector Separation

SOLAR COLLECTOR POSITIONING APPARATUS

This application claims the benefit under 35 USC §119(e) of U.S. provisional application Ser. No. 61/417,086 filed Nov. 24, 2010, the entirety of which is incorporated by reference herein.

BACKGROUND OF THE INVENTION

1. Field of the Invention

The invention generally pertains to the field of devices powered by solar energy and in certain embodiments, photovoltaic electrical power generation. Several particular embodiments pertain to an apparatus to which the solar collector modules are attached and more specifically, to the automatic orientation of the solar collector modules in order for the module surface to maintain a substantially perpendicular orientation to the sun's electromagnetic radiation.

2. Description of Related Art

Certain embodiments of the invention pertain to the automatic adjustment of the orientation of the surface of solar collector modules in order to place the module surface perpendicular to the sun's electromagnetic radiation. These embodiments focus on the approach taken to move the photovoltaic modules into a perpendicular orientation to the sun's rays. This movement of solar modules has been given the name "tracking" as an industry wide accepted term and will be used henceforth to refer to this action. There are generally two types of tracking mechanisms currently available commercially to consumers. The first type of tracking system, known as a single axis tracking system, tilts the photovoltaic module from an easterly orientation in the morning to a westerly orientation in the evening. It makes no adjustment for the seasonal inclination and declination of the sun's path across the sky. The second type of tracking system, known as a dual axis tracking system, orients the solar module perpendicular to the sun's rays. It has a means of compensating for the inclination and declination of the sun's path throughout the year.

BRIEF DESCRIPTION OF THE DRAWINGS

FIG. 7 is a perspective view of a second embodiment of the present invention.

DETAILED DESCRIPTION OF SELECTED EMBODIMENTS

Figure 1:
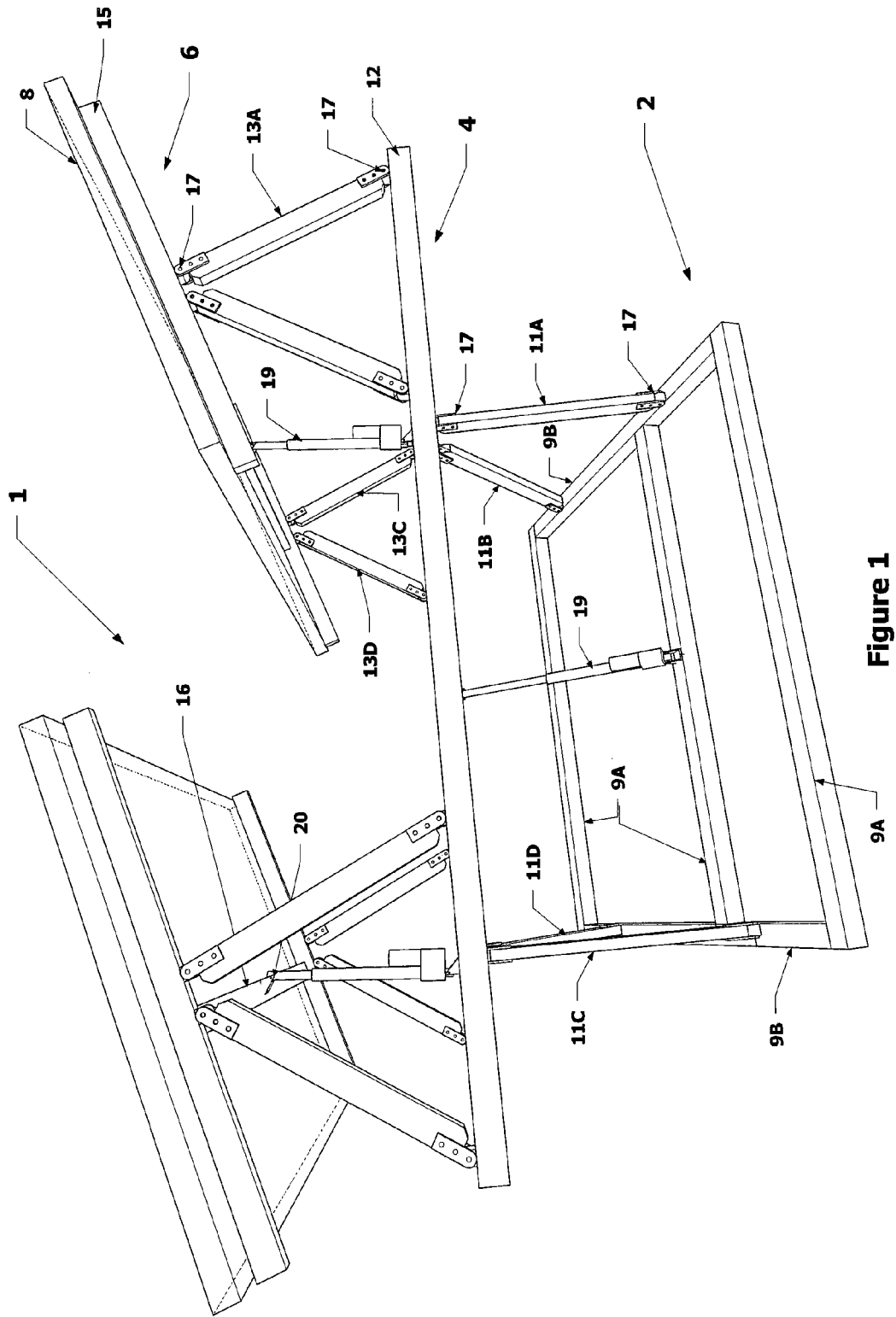
FIG. 1 is a perspective view of one embodiment of the present invention.

One embodiment of the present invention seen in FIG. 1 is a solar collector module positioning apparatus 1. The embodiment of FIG. 1 generally comprises a base structure 2 and an intermediate frame 4 connected to the base structure 2 by base support legs 11. In this embodiment, the base support legs 11 have a hinged connection 17 to the base structure 2 and a hinged connection 17 to the intermediate frame, thereby constraining the movement of the intermediate frame 4 to a plane orthogonal to a plane occupied by the base structure 2.

This embodiment of positioning apparatus 1 also has a solar collector support frame 6 connected to the intermediate frame 4 by intermediate support legs 13. The intermediate support legs 13 likewise have a hinged connection 17 to the solar collector support frame 6 and a hinged connection 17 to the intermediate frame 4, thereby constraining the movement of the solar collector support frame 6 to a plane orthogonal to a plane occupied by the intermediate frame 4. As used herein, "orthogonal" means two objects (e.g., vectors or planes) intersecting at right angles.

As used in this description, the term "solar collector module" means any device which collects solar energy for a useful purpose or redirects energy for the purpose of remote collection. One example of a solar collector module is a photovoltaic panel or module which converts solar energy into electricity. Other nonlimiting examples of a solar collector module are a solar water heater collector panel, a solar thermal condenser, a solar thermal evaporator, or a mirror.

The hinged connection 17 seen in FIG. 1 is a representative depiction of a generic hinge assembly. "Hinged connection" as used in this description means any type of connection which allows some range of rotation, but allows no, or substantially no, translation. Nonlimiting examples include pinned connections, pivoting connections, pillow blocks, axle and bearing connections, and pinned clevises. In the embodiment of FIG. 1, the hinged connections 17 substantially limit the hinged element to rotation in a single plane.

The base structure 2 seen in FIG. 1 is a frame structure composed of a series of base frame members 9, which form a generally rectangular base structure from lateral frame members 9B and longitudinal frame members 9A. The designation of base frame members 9 as lateral and longitudinal is largely arbitrary except that in use, many embodiments will orient base frame members 9A roughly aligned in a East-West orientation, leaving lateral base frame members 9B aligned generally North-South. Base frame members 9 may be formed of any sufficiently rigid material (taking into account strength of the material and cross-sectional shape/area) and nonlimiting examples include wood, metals (preferably light weight metals such as aluminum), and sufficiently rigid polymer materials. Although base structure 2 in FIG. 1 is a frame structure, base structure 2 may be of a non-frame type as disclose in other embodiments described infra. Any number of different base structures may be employed as long as they provide a suitable connection point for the base support legs.

Although not as clearly seen in FIG. 1, it will be understood that intermediate frame 4 is constructed of frame members 12 in substantially the same manner as described in reference to base frame members 9. The embodiment of FIG. 1 illustrates two base support legs 11A and 11B connected at their lower ends (via hinged connections 17) to one lateral base frame member 9B and two other base support legs 11C and 11D connected to the opposing lateral base frame member 9B. As suggested above, base support legs 11 are connected at their upper ends (via hinged connections 17) to intermediate frame members 12. The device of FIG. 1 positions the intermediate support legs 13 between intermediate frame 4 and solar collector support frame 6 in a substantially similar manner. Intermediate support legs 13A and 13B will be hinged at each end to intermediate frame member 12 and solar collector support frame member 15, respectively, while intermediate support legs 13C and 13D will be hinged at each end to the opposing intermediate frame member 12 and collector support frame member 15. Although FIG. 1 shows two collector support frames 6 positioned on intermediate frame 4, it will be understood that a single collector support frame 6 or more than two collector support frames 6 could be positioned on intermediate frame 4.

Generally the collector support frames 6 will be formed of rigid frame members with the solar collector device 8 connected to the collector support frames 6. Naturally, collector support frames 6 could take other, non-frame forms, for example a single piece of planar material (e.g., a plywood section). Likewise, there may be embodiments where the structure of the solar collector module itself is sufficiently strong to allow direct attachment to the hinged connections 17 of the intermediate support legs 13. In such cases, the solar collector module's integral structure may be considered the collector support frame 6.

As described in more detail below in reference to FIG. 6, the hinged connection arrangement of the intermediate support members 13 between the intermediate frame 4 and the collector support frame 6 acts to limit the rotation of collector support frame 6 to a single plane of rotation (see FIG. 3A) relative to intermediate frame 4. Likewise, the hinged base support legs 11 act to limit intermediate frame 4 to a single plane of rotation relative to base support 2.

FIG. 1 further generally illustrates how a linear actuator 19 will be positioned between intermediate frame 4 and collector support frame 6. In the specific embodiment of FIG. 1, linear actuator 19 attaches to a cross member 16 on collector support frame 6 and a frame member (hidden from view in FIG. 1) on intermediate frame 4. In this embodiment, linear actuator 19 is pivotally connected (i.e., a hinged connection or pinned connection) to both cross member 16 and the intermediate frame member. Linear actuator 19 may be any number of devices that allow a controlled extension and retraction of the actuator. In a preferred embodiment, linear actuator 19 is a power screw type device, but could alternatively be a hydraulically or pneumatically activated cylinder, or a rack and pinion gear, a rotating cam, a chain drive and pulley or a belt drive and pulley. Although FIG. 1 shows only one linear actuator 19 between intermediate frame 4 and collector support frame 6, other embodiments could employ two or more. Although not shown as clearly in FIG. 1, it will be understood that a linear actuator 19 is also connected between base support 2 and intermediate frame 4 in a manner similar to that described above. Certain embodiments (e.g., FIGS. 8-9) position the actuator to achieve the same range of motion in the tilt angle of the frame being moved for both the full extension and full retraction of the actuator. For example, a +/−45° tilt angle as described in more detail with regards to the 4-bar linkage discussed below.

Control System Algorithm

Figure 2:
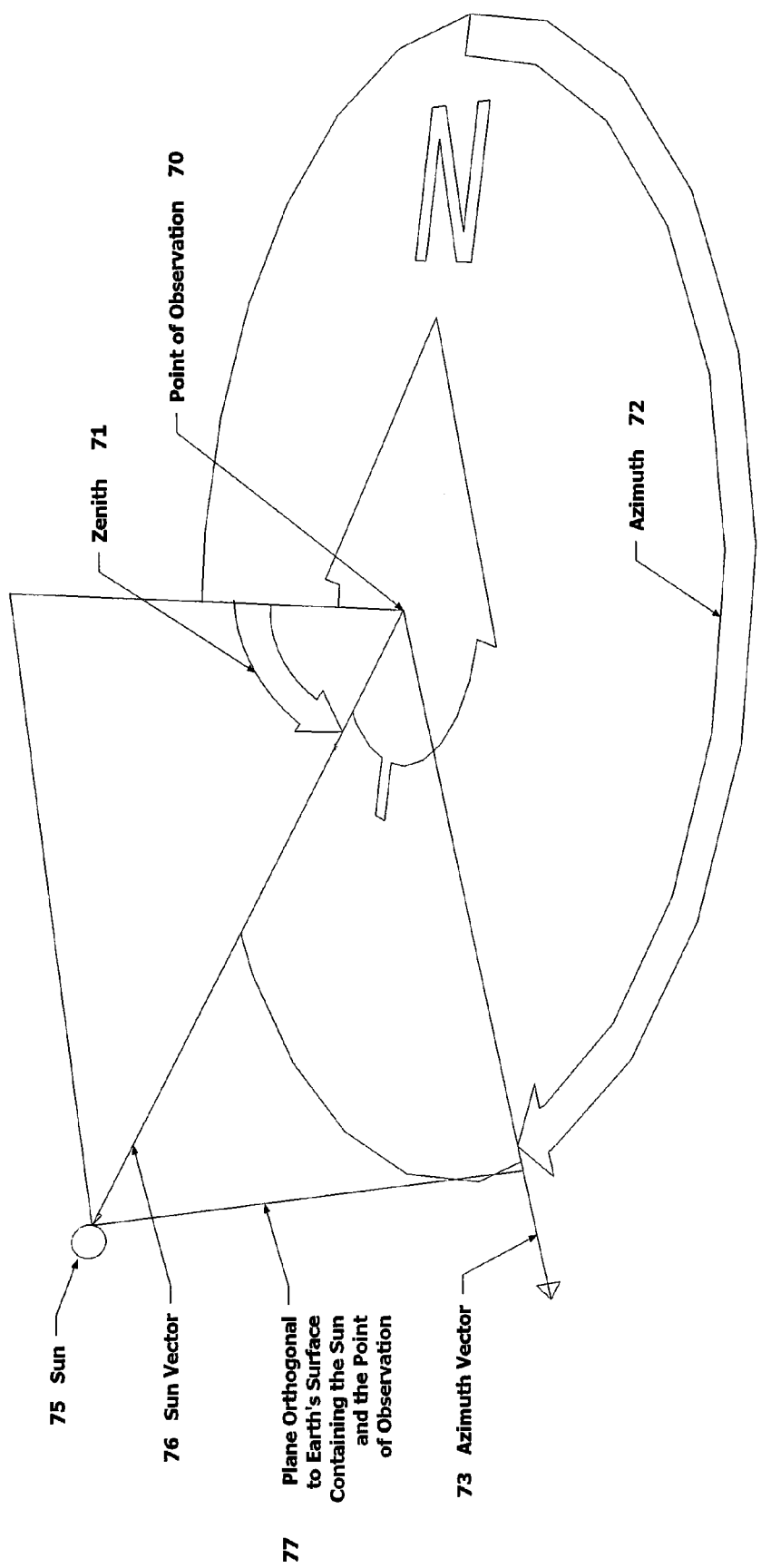
FIG. 2 is a diagram of sun position in spherical coordinates.

As suggested above, one primary function of the described embodiments is to have solar collector modules attached to the collector support frame 6 reliably maintain a certain position relative to solar movement. One embodiment will utilize a control method and system which is illustrated as follows in conjunction with FIGS. 2-4. Viewing FIG. 2, the point on the surface of the earth at which this solar collector positioning apparatus is affixed is called the Point of Observation 70. The plane parallel to the Earth surface and including the Point of Observation 70 will be referred to as the "ground surface plane." The control system calculates a single vector which has at its origin the point of observation and passes through the sun. This vector (referred to henceforth as the Sun Vector 76) is unique to the systems location on the surface of the earth, the day of the year and the time of day. Inputs to the system to calculate this vector are the latitude and longitude of the point of observation, the date, and the time of day. Using these inputs, the Sun Vector may be calculated by standard methods such as published by the U.S. National Oceanic and Atmospheric Administration and described in greater detail in the attached Appendix A.

The resultant Sun Vector 76 is comprised of two coordinate angles (the azimuth 72 and the zenith 71) and a scalar magnitude. For the purposes of these calculations the magnitude will be unity (1). The azimuth 72 (or sometimes "azimuth angle") is the angle of rotation in the ground surface plane. The starting point for the azimuth angle 72 is true North (0 degrees when the system is positioned in a North/South orientation) and the rotation proceeds in a clockwise direction with due East at 90 degrees, due South at 180 degrees and due West at 270 degrees. The azimuth angle 72 stops at its intersection with a plane orthogonal to the earth's surface and containing within it the sun 75 and the point of observation 70. The zenith 71 is the angle measured between a line perpendicular to the ground surface plane at the point of observation 70 and a line between the point of observation 70 and the sun 75. The starting point for the zenith angle 71 is directly overhead (0 degrees) and proceeds in a positive direction toward the azimuth vector in a plane containing the sun vector 76 and the point of observation 70. The zenith angle stops when the zenith vector intersects the sun 75 and the point of observation 70. If the system is oriented other than due North, then the azimuth angle 72 may be simply adjusted for the angular magnitude and direction which the orientation deviates from true North.

Figure 3A:
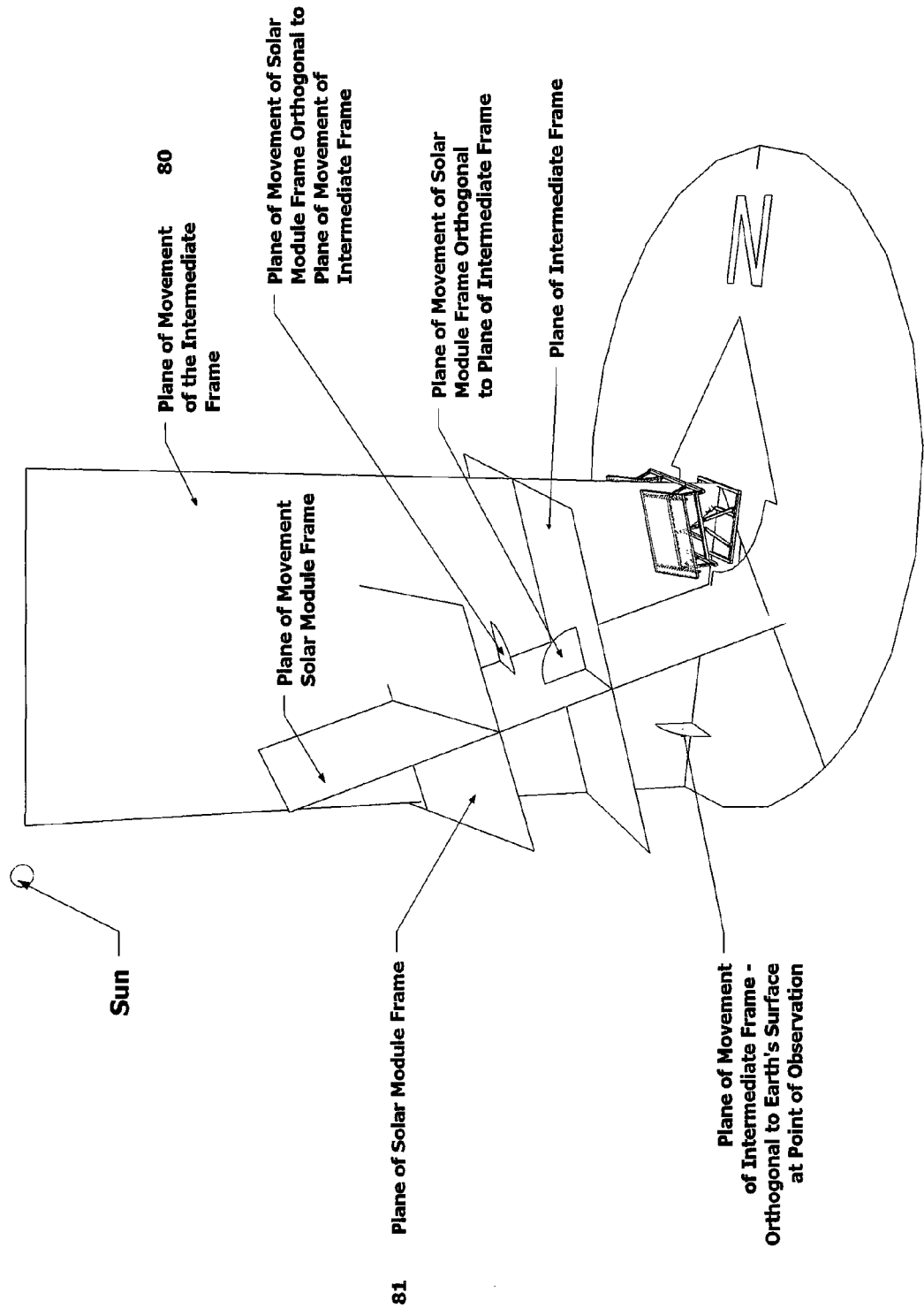
FIG. 3A is a diagram of sun position relative to apparatus position in one embodiment.
Figure 3B:
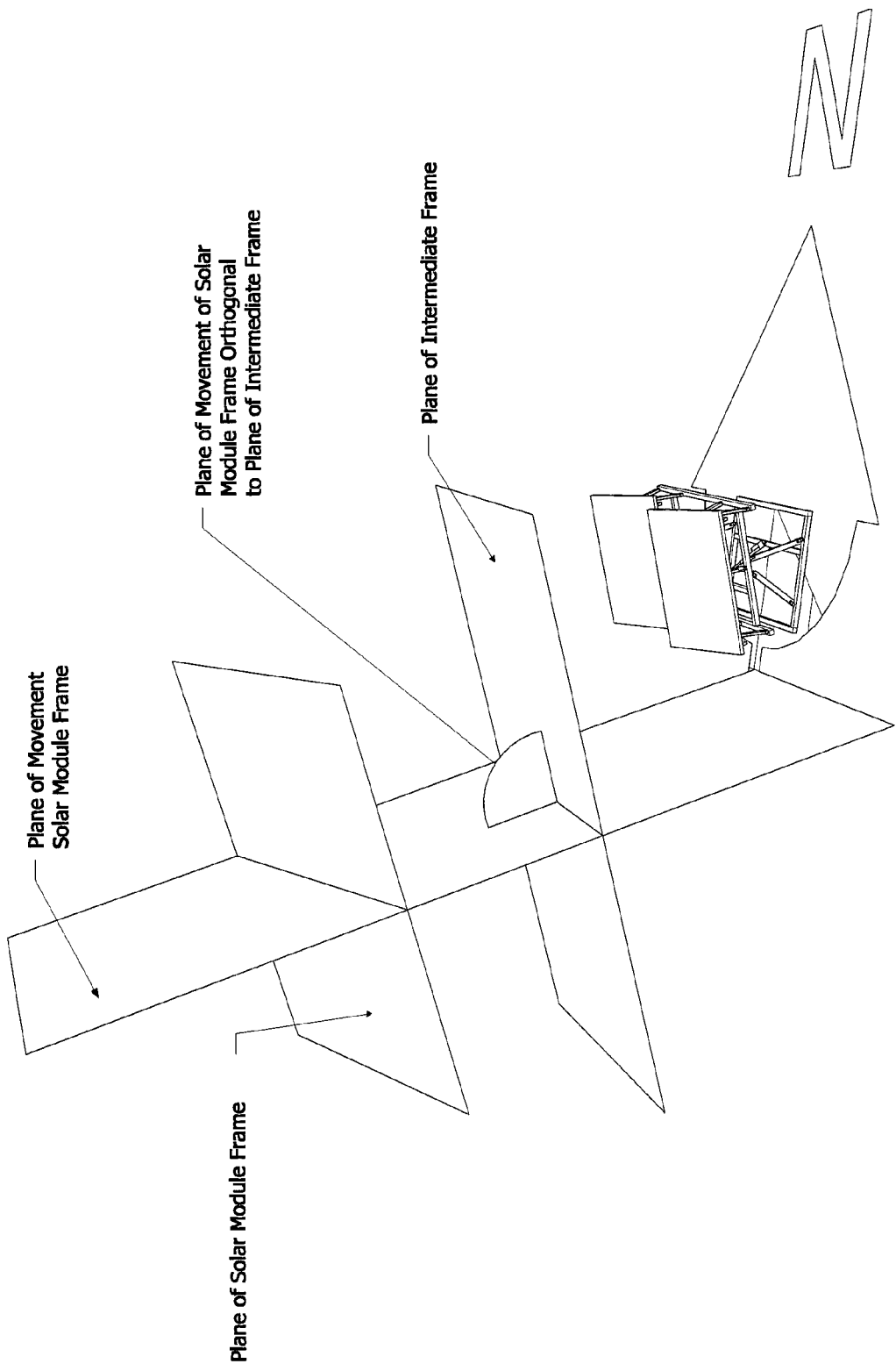
FIG. 3B is a diagram of sun position relative to apparatus position in an alternative embodiment.
Figure 4:
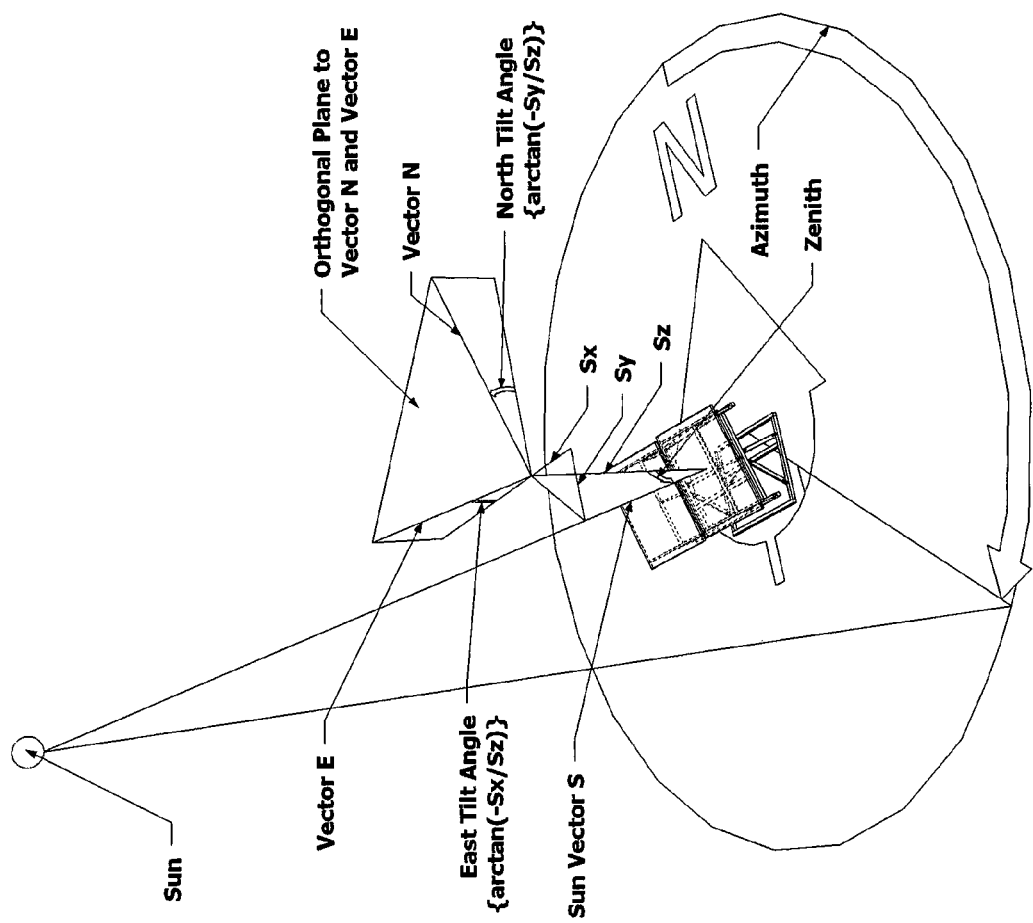
FIG. 4 is a diagram showing tilt angles of the apparatus of FIG. 1.

As suggested earlier, the solar collector positioning system of FIG. 1 is only capable of moving in two planes. Viewing FIG. 3A, the "compass orientation" of the system in FIG. 3A is true North in the sense that the intermediate frame is oriented such that it tilts in the North/South direction. The first plane of movement 80, that of the intermediate frame 4, is orthogonal to the earth's surface at the point of observation 70. The second plane of movement 81, that of the solar collector support frame 6, is orthogonal to the first plane of movement 80 and orthogonal to the intermediate frame 4. Consequently, the system requires the reduction of the calculated Sun Vector (S) into component vectors. These component vectors are required to be (i) contained within the planes of movement of the solar collector positioning apparatus and (ii) the cross product (of these vectors) to produce the Sun Vector (S). As suggested by FIG. 4, the component vectors will be named Vector N (north) and Vector E (east) respectively. Vector N will be located in a plane containing the 0 degree azimuth vector and the 0 degree zenith vector. Vector E will be located in a plane containing the 90 degree azimuth vector and the 0 degree zenith vector. The origin of both vectors will be the point of observation. The angular displacement of the component vectors will be zero when the vectors are parallel to the surface of the earth. The displacement angle proceeds in a positive direction toward the 0 degree zenith vector. Each component vector will have an angular displacement of 90 degrees when it is parallel to the 0 degree zenith vector.

The first step in determining Vector N and Vector E is to convert the spherical coordinates of the Sun Vector (S) into Cartesian coordinates represented by $S_x$ (east component), $S_y$ (north component), $S_z$ (up component, i.e., perpendicular to the earth surface in all directions). This is accomplished with following equations:

General Equation for Spherical to Cartesian Conversion $r = \sqrt{x^2+y^2+z^2}$; $r$ is the radius of the sphere $S_x = r * \sin(\text{zenith}) * \sin(\text{azimuth})$ $S_y = r * \sin(\text{zenith}) * \cos(\text{azimuth})$ $S_z = r * \cos(\text{zenith})$ As stated earlier, the Sun Vector is defined as having a scalar magnitude of one (a unity vector) which reduces the above equations to:

$r = 1$ $S_x = \sin(\text{zenith}) * \sin(\text{azimuth})$ $S_y = \sin(\text{zenith}) * \cos(\text{azimuth})$ $S_z = \cos(\text{zenith})$ The sun vector (Vector S) will be defined by Cartesian components ($S_x$, $S_y$, $S_z$). It follows that Vector N will be defined by Cartesian components ($N_x$, $N_y$, $N_z$) and Vector E will be defined by ($E_x$, $E_y$, $E_z$). The angle of Vector N from 0 degrees azimuth is defined as the north tilt angle for the solar collector positioning apparatus. The angle of Vector E from 90 degrees azimuth is defined as the east tilt angle for the solar collector positioning apparatus. These angles can be found as follows:

$$\text{North Tilt Angle} = \tan^{-1} \frac{N_x}{N_y}$$

$$\text{East Tilt Angle} = \tan^{-1} \frac{E_z}{E_x}$$

In order to find the tilt angles, the Sun Vector must first be resolved into orthogonal vectors, Vector N and Vector E. This is accomplished through the cross product from vector algebra as follows:

$S = E \times N$

Unit vectors representing Vector N and Vector E can be defined as:

Unit Vector $N = (0, N_y, N_z)$

Unit Vector $E = (E_x, 0, E_z)$

Using matrix algebra:

$$E \times N = \det \begin{Bmatrix} S_x & S_y & S_z \\ E_x & E_y & E_z \\ N_x & N_y & N_z \end{Bmatrix}$$

$(S_x, S_y, S_z) = (-E_z N_y)x, (-N_z E_x)y, (E_x N_y)z$

So:

$S_x = -E_z N_y$ $S_y = -N_z E_x$ $S_z = E_x N_y$

Rewriting these equations and substituting into the tilt angle equations:

$$\text{North Tilt Angle} = \tan^{-1} -\frac{S_y}{S_z}$$

$$\text{East Tilt Angle} = \tan^{-1} -\frac{S_x}{S_z}$$

It will be understood that these tilt angles are the angles between the sun vector's two orthogonal vectors and the ground surface plane. Using the embodiment of FIG. 1 as an example, when the positioning apparatus is oriented in the manner suggested in FIGS. 3A to 4, the North tilt angle (sometimes referred to as the "North/South" tilt angle) is the angle that intermediate frame 4 will tilt relative to the ground surface plane. The East tilt angle (sometimes referred to as the "East/West" tilt angle) is the angle that the solar collector support frame 6 will tilt relative to the ground surface plane. However, in the embodiments described herein, the control system will typically tilt the solar collector support frame (by the magnitude of the East tilt angle) relative to the position of the plane of the intermediate frame 4. The use of "North" and "East" are relative to the compass orientation of the apparatus 1. For example, rotation of apparatus 1 +/−90° would result in the East tilt angle being the angle that intermediate frame 4 will tilt and the North tilt angle being the angle that the solar collector support frame 6 will tilt. The "tilt angle" described above may also sometimes be referred to herein as an "angle of inclination."

Figure 5:
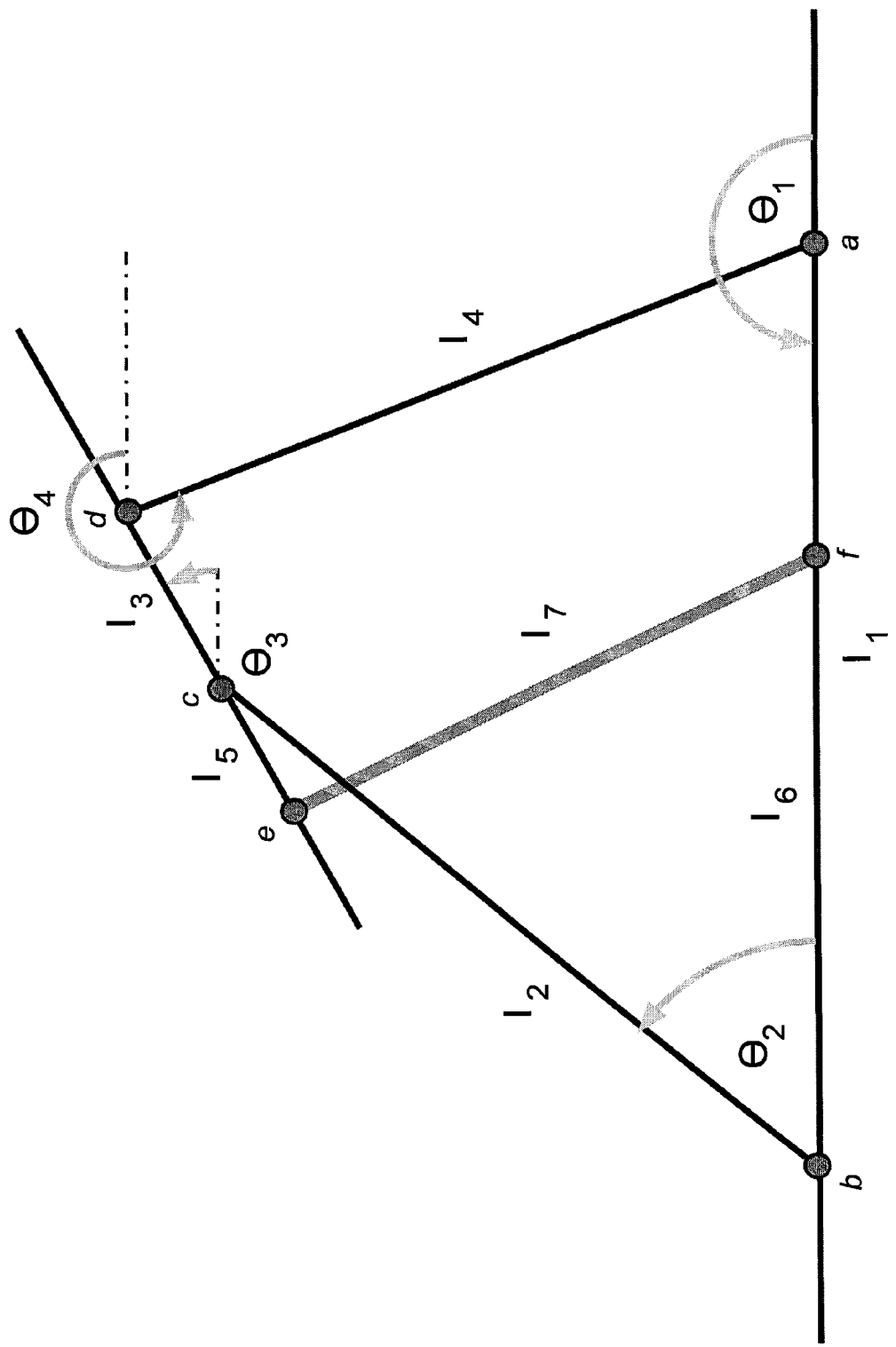
FIG. 5 is a schematic representation of tilt angles in the apparatus of FIG. 1.

In the illustrated embodiments, it is the length of the actuator 19 which determines the orientation angle of the collector support frame 6 or the intermediate frame 4. However, the mathematical calculation to determine the actuator length may be different for different embodiments. In the embodiment of FIG. 1, the geometrical interconnection of the support legs 11 (between the base 2 and the intermediate frame 4) and support legs 13 (between the intermediate frame 4 and the collector support frame 6) form a typical four bar linkage. A simple diagram of a four bar linkage is depicted in FIG. 5. In the embodiment of FIG. 5, the upper and lower connection points are dictated by the actuator extended length, the actuator retracted length, the support leg lengths and the distance between the support leg connection points on the upper and lower frame. The derivation below results in a value for $l_7$ (the actuator length) for the desired value of $\theta_3$ (the tilt angle).

The following equations define the four bar linkage shown:

$|l_1| = \overline{ab}$ $|l_2| = \overline{bc}$ $|I_3|=\overline{cd}$ $|I_4|=\overline{ad}$ $|I_5|=\overline{ce}$ $|I_6|=\overline{bf}$ $|I_7|=\overline{ef}$ (actuator length)

According to vector geometry the following equations apply to the linkage:

The Position Vectors:

$$\vec{I_1}+\vec{I_2}+\vec{I_3}+\vec{I_4}=0 \quad\quad 1)$$

The Horizontal Distances:

$$|I_1|*\cos(\theta_1)+|I_2|*\cos(\theta_2)+|I_3|*\cos(\theta_3)+|I_4|*\cos(\theta_4)=0 \quad\quad 2)$$

The Vertical Distances:

$$|I_1|*\sin(\theta_1)+|I_2|*\sin(\theta_2)+|I_3|*\sin(\theta_3)+|I_4|*\sin(\theta_4)=0 \quad\quad 3)$$

Assuming that $\theta_1=180°$ and setting equation 2 equal to equation 3 yields:

$$-I_1*\cos(\theta_1)+|I_2|*\cos(\theta_2)+|I_3|*\cos(\theta_3)+|I_4|*\cos(\theta_4)=0$$

$$|I_2|*\sin(\theta_2)+|I_3|*\sin(\theta_3)+|I_4|*\sin(\theta_4)=0$$

Moving all terms except those containing $I_4$ to the right hand side of the equation and squaring both sides yields:

$$|I_4|^2*\cos^2(\theta_4)=(|I_1|-|I_2|*\cos(\theta_2)-|I_3|*\cos(\theta_3))^2$$

$$|I_4|^2*\sin^2(\theta_4)=(-|I_2|*\sin(\theta_2)-|I_3|*\sin(\theta_3))^2$$

Combining the equations above and applying the trigonometric relationships $\cos^2(\theta)*\cos(\theta)=1$ yields:

$$\frac{|I_4|^2-|I_1|^2-|I_2|^2-|I_3|^2}{2*I_2*I_3}+\frac{I_1}{I_3}*\cos(\theta_2)+\frac{I_1}{I_2}*\cos(\theta_3) =$$
$$\cos(\theta_2)*\cos(\theta_3)+\sin(\theta_2)*\sin(\theta_3).$$

Freudenstein's Equation is the represented by:

$$K_1*\cos(\theta_2)+K_2*\cos(\theta_3)+K_3=\cos(\theta_2)*\cos(\theta_3)+\sin(\theta_2)*\sin(\theta_3)$$

Where:

$$K_1=\frac{I_1}{I_3}$$

$$K_2=\frac{I_1}{I_2}$$

$$K_3=\frac{(I_4^2-I_1^2-I_2^2-I_3^2)}{(2*I_2*I_3)}$$

Rewriting:

$$K_2*\cos(\theta_3)+K_3=(\cos(\theta_3)-K_1)*\cos(\theta_2)+\sin(\theta_3)*\sin(\theta_2)$$

In FIG. 5 above, point C can be located in Cartesian coordinates as (X,Y). If we assume in our Cartesian system that the origin is located at point B then the following formula applies to our system:

$$X^2+Y^2=I_2^2.$$

Figure 6:
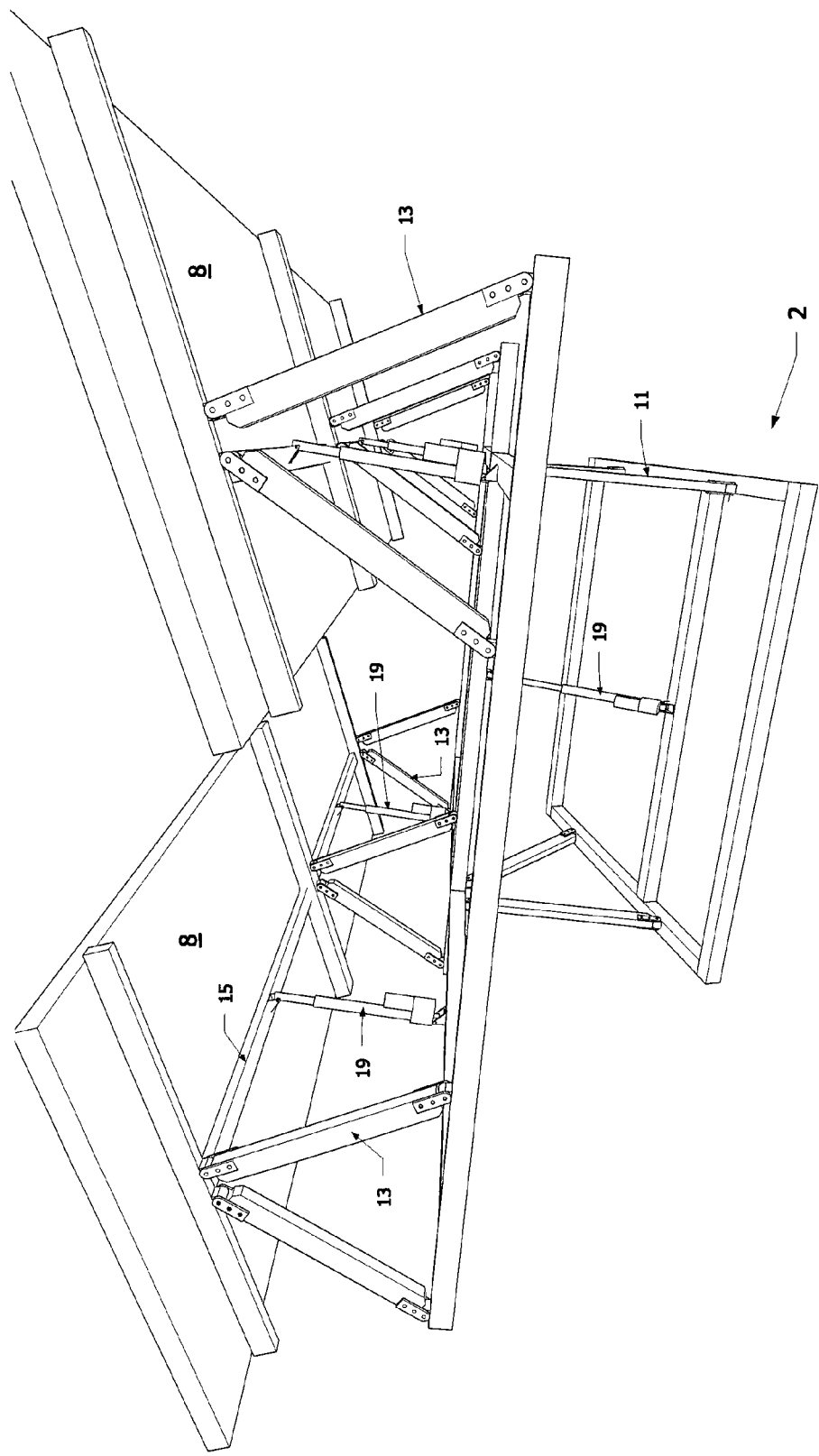
FIG. 6 illustrates multiple devices such as in FIG. 1 positioned as an integrated unit.

The following equations would also apply to FIG. 6.

$$Y=\sqrt{I_2^2-X^2}$$

$$\cos(\theta_2)=\frac{X}{I_2}$$

$$\sin(\theta_2)=\frac{\sqrt{I_2^2-X^2}}{I_2}$$

Substituting these identities into Freudenstein's equation reveals:

$$K_2*\cos(\theta_3)+K_3=(\cos(\theta_3)-K_1)*\frac{X}{I_2}+\sin(\theta_3)*\frac{\sqrt{I_2^2-X^2}}{I_2}$$

Now $\theta_3$ represents a tilt angle either north or east depending upon whether the calculation relates to the intermediate frame 4 and the base support legs 11 or the collector support frame 6 and the intermediate support legs 13, respectively. The tilt angles were calculated above based upon the Sun Vector which in turn was determined by the time of day and day of the year. So, $\theta_3$ is a know value. The values for $I_1$, $I_2$, $I_3$, $I_4$, $I_5$, $I_6$ are also know values based upon the construction of the frame and placement of the legs. So the equation above can be further simplified by substituting placeholders for the known values.

$$K_4=K_5*X+K_6*\sqrt{I_2^2-X^2}$$

Where:

$$K_4=(K_2*\cos(\theta_3)+K_3)*I_2$$

$$K_5=\cos(\theta_3)-K_1$$

$$K_6=\sin(\theta_3)$$

Rearranging:

$$K_4-(K_5*X)=+K_6*\sqrt{(I_2-X)*(I_2+X)}$$

Squaring both sides then simplify:

$$(K_5^2-K_6^2)*X^2-2*(K_4*K_5*X)+(K_4^2-K_6^2*I_2^2)=0$$

Set:

$$a=(K_5^2-K_6^2)$$

$$b=-2*(K_4*K_5)$$

$$c=(K_4^2-K_6^2*I_2^2)$$

Using the quadratic equation $$x=\frac{-b\pm\sqrt{b^2-4ac}}{2a}$$

we can find X.

Using X and $I_2$ we can find Y. Using X and Y and $I_5$ we can find the location in the Cartesian plane for the upper connection point of the actuator (represented by Point e in FIG. 5) using Cartesian algebra. $I_6$ denotes location of Point f. Finally the distance $I_7$ (the overall length of the actuator) can be calculated. Next we subtract from distance $I_7$ the length of the actuator when the actuator is fully retracted. This gives the stroke length that is required to provide the desired tilt angle in the FIG. 1 embodiment.

FIG. 5 also illustrates an embodiment where a first end (or lower end) of the linear actuator $I_7$ is connected to the base support at point "f" between the hinged connections on the base support (i.e., points "a" and "b"). However, the second end (or upper end) of the linear actuator is connected to the intermediate frame at a point "e" outside of the hinged connections "c" and "d" on the intermediate frame. A similar arrangement could be employed for the linear actuator acting between the intermediate frame and the solar collector support frame. However, FIG. 5 is merely one embodiment and in alternate embodiments, the second or upper end of the linear actuator could connect above point "d" shown in FIG. 5.

FIG. 6 illustrates one of many potential modifications of the FIG. 1 embodiment. FIG. 6 demonstrates how a series of collector support frames 6 may be positioned on an intermediate frame 4. In this embodiment, the number of intermediate support legs 13 is a multiple of two (i.e., six support legs 13 seen on each set of collector support frames 6 seen in FIG. 6) and can be multiplied (i.e., 8, 10, 12, . . . ) to any extent as long as intermediate frame 4 and base structure 2 have sufficient structural strength to bear that number of collector support frames 6. As with the FIG. 1 embodiment, FIG. 6 illustrates one linear actuator 19 between each two intermediate support legs 13, but it will be understood that more than one linear actuator 19 could be employed. It can be seen that the base support legs 11 in this embodiment are also employed as multiples of two.

FIG. 7 illustrates one alternative base support 2. Rather than base support 2 being a frame structure as seen in FIG. 1, FIG. 7 shows a series of piers 25 forming the base support 2. In this embodiment, each base support leg is secured to a pier 25 by a hinged connection 17. Likewise, the lower end of actuator 19 is also pinned to a pier 25. Piers 25 could be formed of virtually any rigid material such as wood, concrete, steel, or sufficiently rigid polymers. Naturally, the framed base support 2 of FIG. 1 and the pier base support 2 of FIG. 7 are just two nonlimiting examples of the various shapes the base support 2 could encompass. Many other base support structures could be employed which likewise would serve as anchor points for the hinged connections 17.

Figure 8A:
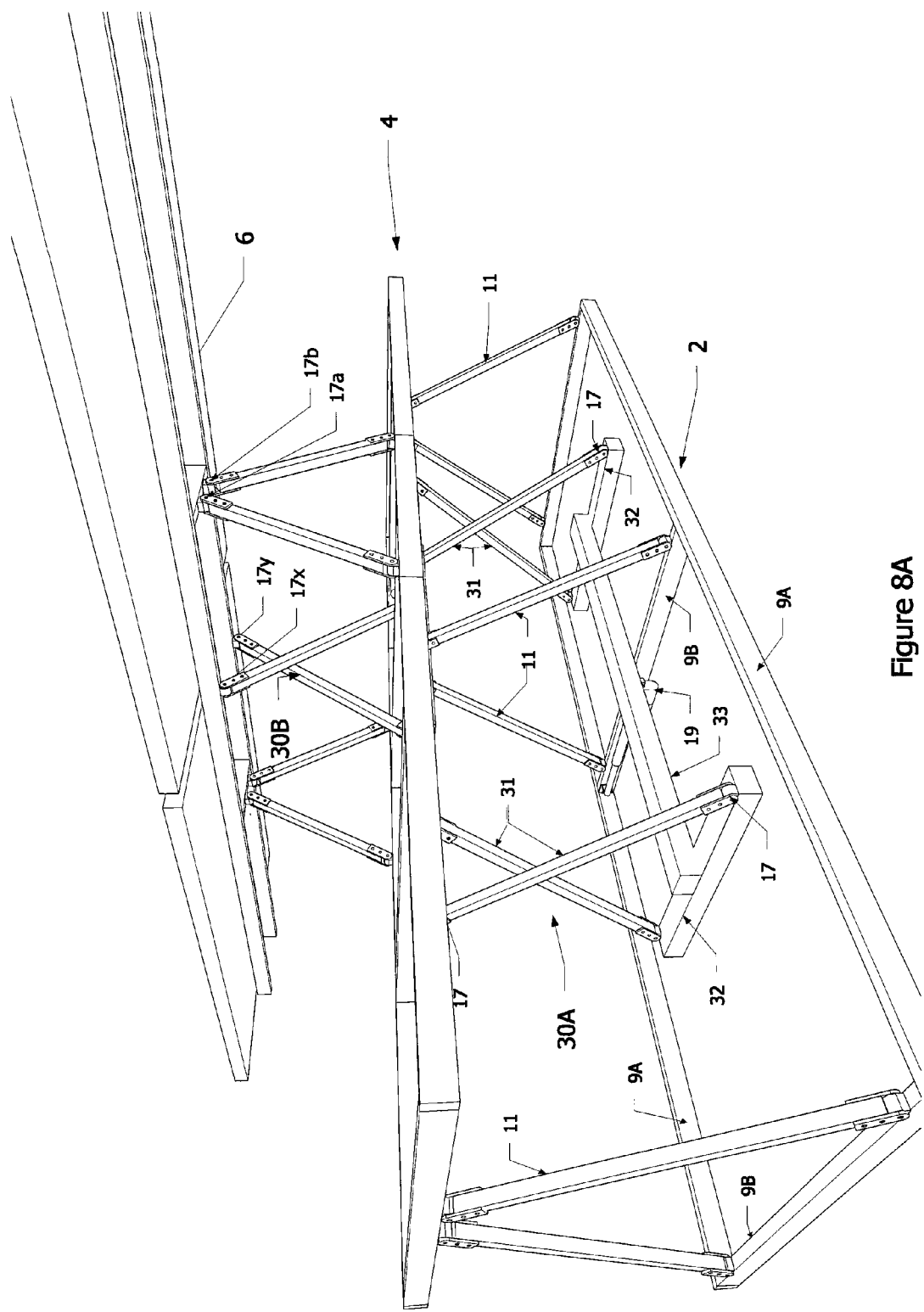
FIG. 8A is a perspective view of a third embodiment of the present invention.

FIG. 8A illustrate another embodiment of the invention employing an integrated actuation system. In FIG. 8A, the integrated actuation system takes the form of Chebyshev linkage 30. It can be seen that this embodiment is similar to FIG. 1 in that the base structure 2 includes longitudinal frame members 9A and lateral frame members 9B with at least two (i.e., three in FIG. 8A) sets of base support legs 11. The Chebyshev linkage 30A is positioned between the base support 2 and the intermediate frame 4 and generally comprises the linkage support legs 31, the actuating links 32, and the connecting link 33. The linkage support legs 31 are connected at their upper ends to the intermediate frame 4 by hinged connections 17 in a manner similar to previous embodiments. The lower ends of linkage support legs 31 are connected to actuating links 32 via hinged connections 17. The two actuating links 32 seen in FIG. 8A are in turn attached to the connecting link 33. The actuator 19 is attached (i.e., pinned) at one end to a base frame member and at the other end to connecting link 33. It will be understood that the extension/retraction of actuator 19 moves connecting link 33 toward and away from, respectively, the near side base frame member 9A (as viewed in FIG. 8A). This arrangement results in actuator 19 being connected between the base structure and the intermediate frame by way of a linkage which translates linear actuator extension within a plane parallel to a ground surface plane into rotation of the intermediate frame. Although somewhat hidden from view in FIG. 8A, it will be understood that a similar Chebyshev linkage 30B is also positioned in the same manner as described above between the intermediate frame 4 and the collector support frame 6.

Figure 13:
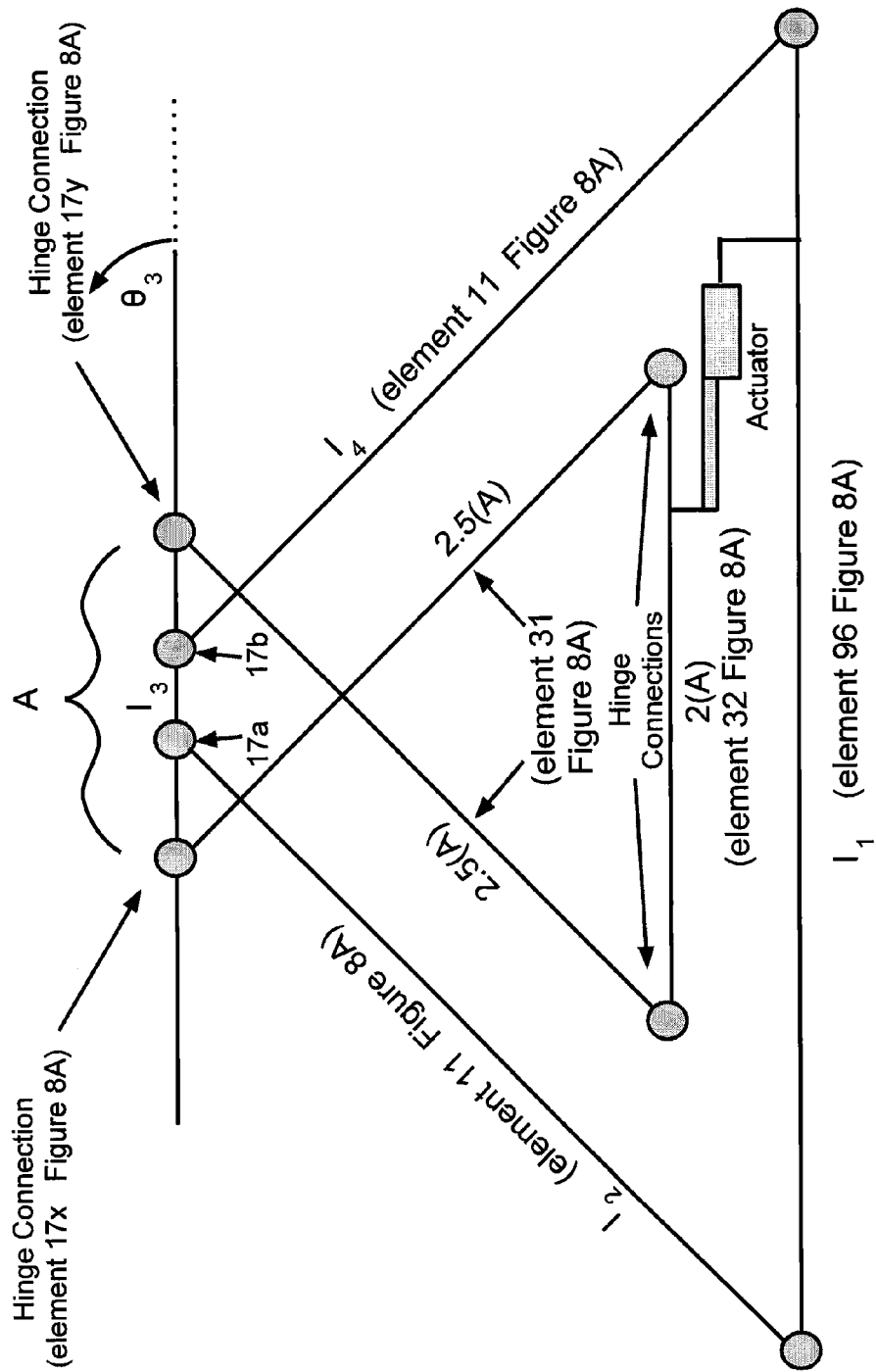
FIG. 13 is a schematic illustration of the Chebychev Linkage seen in FIGS. 8A and 8B.

The Chebyshev linkage acts to convert the tilting motion of the intermediate frame 4 to a straight line approximation, i.e., a given linear motion of the actuator 19 is converted into a given tilt angle of the intermediate frame 4 (or the collector support frame 6). In a Chebyshev linkage, the full linear travel of the connecting link 33 corresponds to an angular change in $\theta_3$ (as seen in FIG. 5) from $-90°$ to $90°$. The first step in designing the embodiment shown in FIG. 8A is to determine the stroke length of the actuator which will be employed. Next, the range of motion for the Chebyshev linkage should be determined. The range of motion chosen at this step will ultimately be the limiting factor for the angular movement of the collector in this plane. While imparting a tilting motion to the intermediate frame 4, intermediate frame 4 also moves linearly in the direction of the actuator motion. This linear movement in the direction of actuator movement is afforded by the 4 bar linkage. The intermediate frame 4 will move a distance of 2*I3 shown in FIG. 13 over the Chebychev movement from $-90°$ to $90°$. A Chebyshev linkage (shown schematically in FIG. 13) is made of 4 links. In FIGS. 8A and 13, the hinged connections of the 4-bar linkage are denoted as 17a and 17b while the hinged connections of the Chebyshev linkage are denoted 17x and 17y. The link lengths are multiples of the short link defined as "A" (in FIG. 8A, the distance between hinge connections 17x and 17y). There is one link of length 2*A (element 32 in FIG. 8A) and two links of length 2.5*A (elements 31 in FIG. 8A). According to the Chebychev equation, the short link will travel a distance "A" while exhibiting an angular displacement of 90°. Therefore it will travel a distance of 2*A for a full displacement of $-90°$ to $90°$. To achieve the desired range of motion, the actuator must accommodate the linear movement of Chebychev linkage required for the desired angular tilt of frame 4 and the compensation distance for the longitudinal movement of frame 4 due to the 4-bar linkage support.

The Range of Motion/180°=actuator stroke/(2*A+2*I3).

$I_3$ (seen in FIG. 13) is the distance between the hinged connections 17a and 17b of the 4-bar linkage seen in FIG. 8A. Lengths "A" and "$I_3$" are chosen to determine the range of motion desired.

Figure 9:
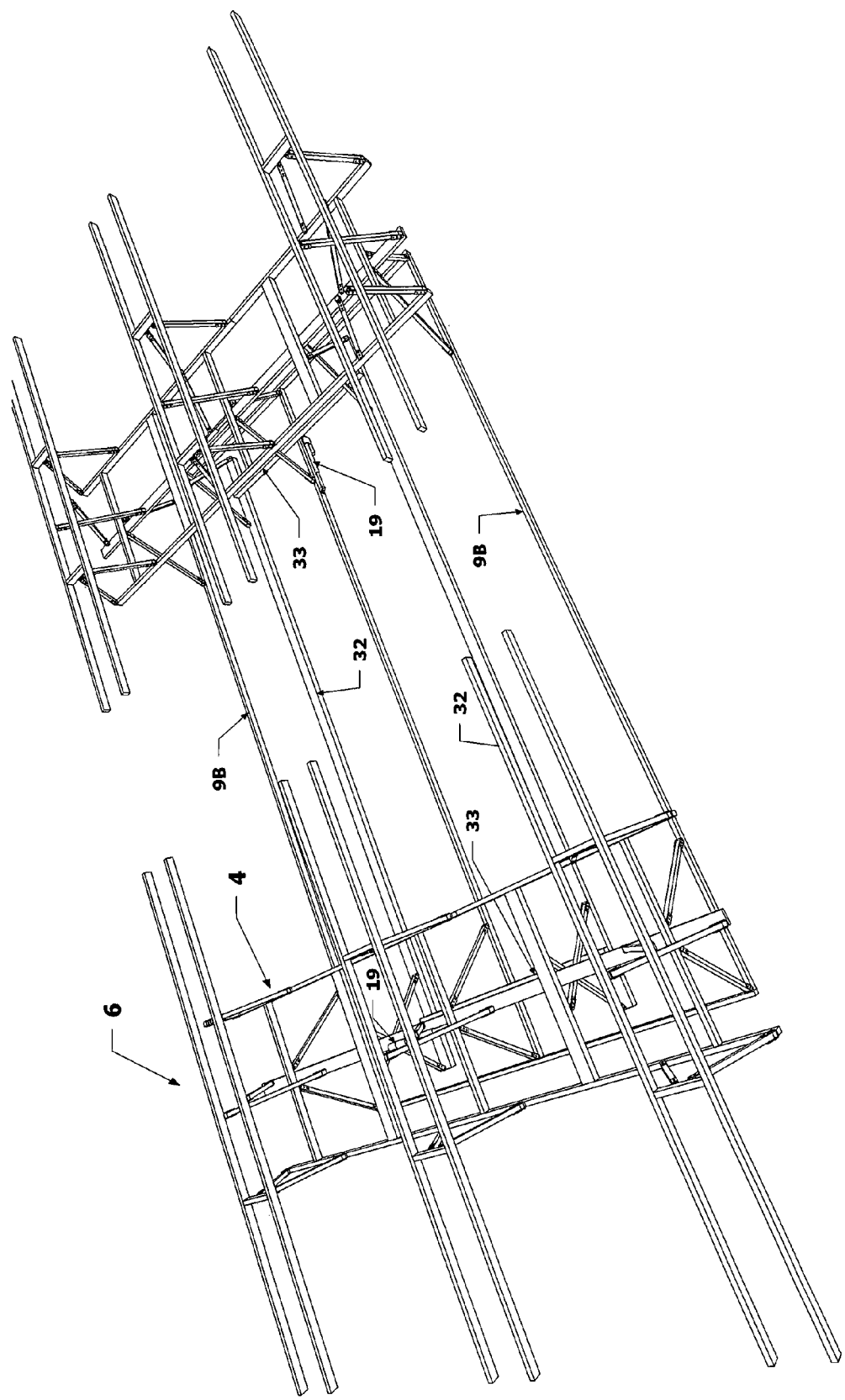
FIG. 9 illustrates multiple devices such as FIG. 8A positioned as an integrated unit.

So, in the embodiments of FIGS. 8A and 9, the linear change of the actuator 19's length corresponds to a linear change in $\theta_3$ (see FIG. 13). Knowing the length of the actuator 19 and the frame tilt angle, $\theta_3$, at the full extension and full retraction of the actuator 19, the length of the actuator 19 at any desired tilt angle is then:

Actuator Length Desired=$\theta_3$/180°*(2*A+2*I3).

Once length "A" was chosen, the remaining elements of the Chebychev linkage are easily found. The remainder of the 4-bar linkage design (after I3 was chosen above) relies on Freudenstein's Equation $$\frac{|I_4|^2 - |I_1|^2 - |I_2|^2 - |I_3|^2}{2 * I_2 * I_3} + \frac{I_1}{I_3} * \cos(\theta_2) + \frac{I_1}{I_2} * \cos(\theta_3) =$$
$$\cos(\theta_2) * \cos(\theta_3) + \sin(\theta_2) * \sin(\theta_3)$$

Knowing I2=I4, design the 4 bar linkage when Theta3=0°. Pick Theta2=60°. Also, when designing the module support choose I4=½(solar collector width). When designing the intermediate frame support choose I4=½(intermediate frame width). Once this is done Freudenstein's equation will reduce to a quadratic equation for I1. Choose I1>I4. Adjustments to I1 & I4 are made in order to accommodate clearances for moving parts.

Figure 15:
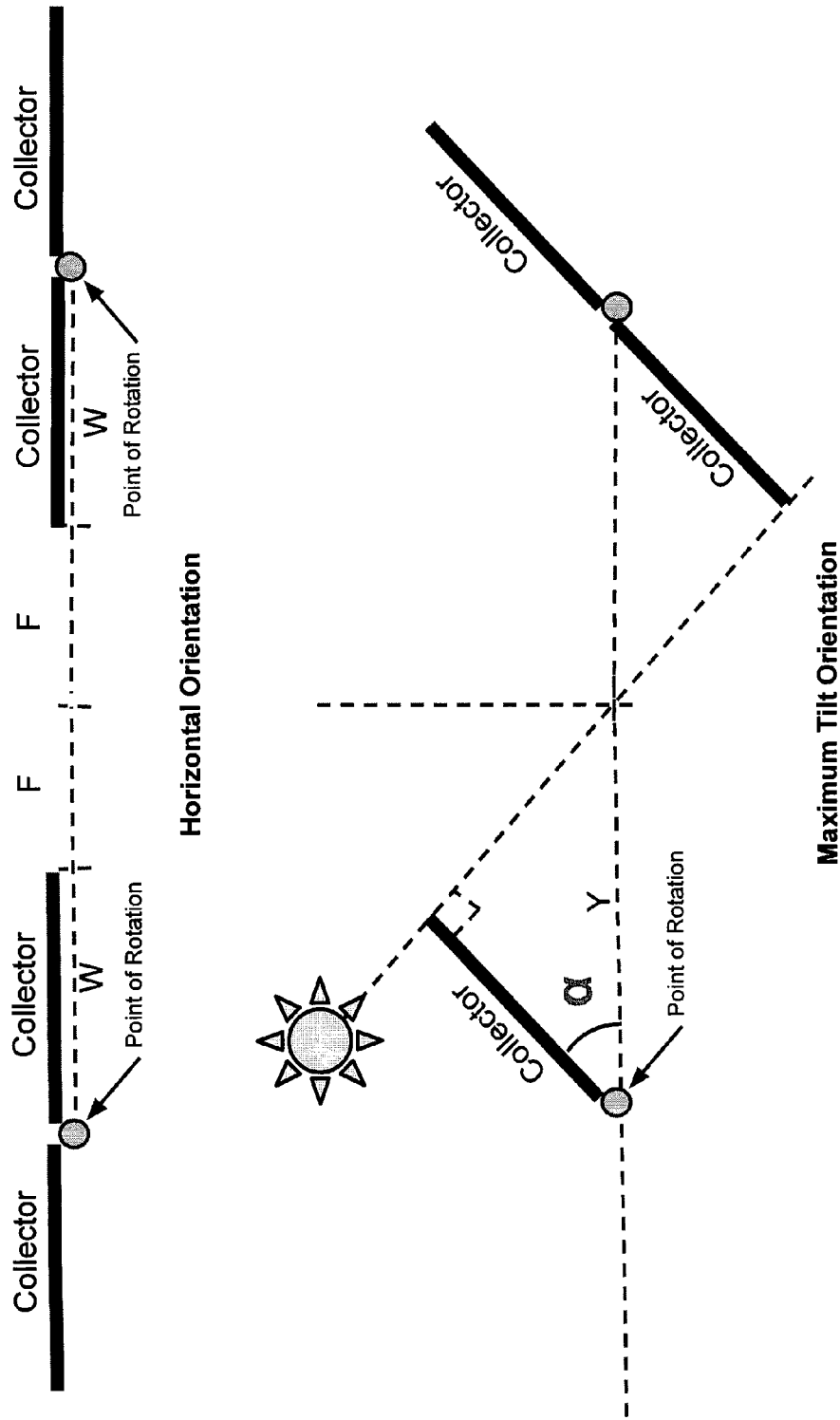
FIG. 15 is a schematic illustration of one example collector panel spacing to avoid shadowing of panels by adjacent panels in an East-West direction.

When multiple solar collector support frames are employed on a single intermediate frame, consideration is preferably given to solar collector support separation distances. This separation distance is preferably provided so that the solar collectors do not cast shade on one another at the extreme end of their designed range of motion. Conceptualizing the embodiment of FIG. 9, FIG. 15 represents the angular movement of adjacent solar collector frames 6 (i.e., the East/West tilt in FIG. 9). The separation distance (F) is defined as the distance between adjacent solar collector edges when the solar collectors are in the horizontal position.

α=east range of motion/2

W=short side length of solar collector $F=2*(W*\cos(\alpha))-W$

Figure 14:
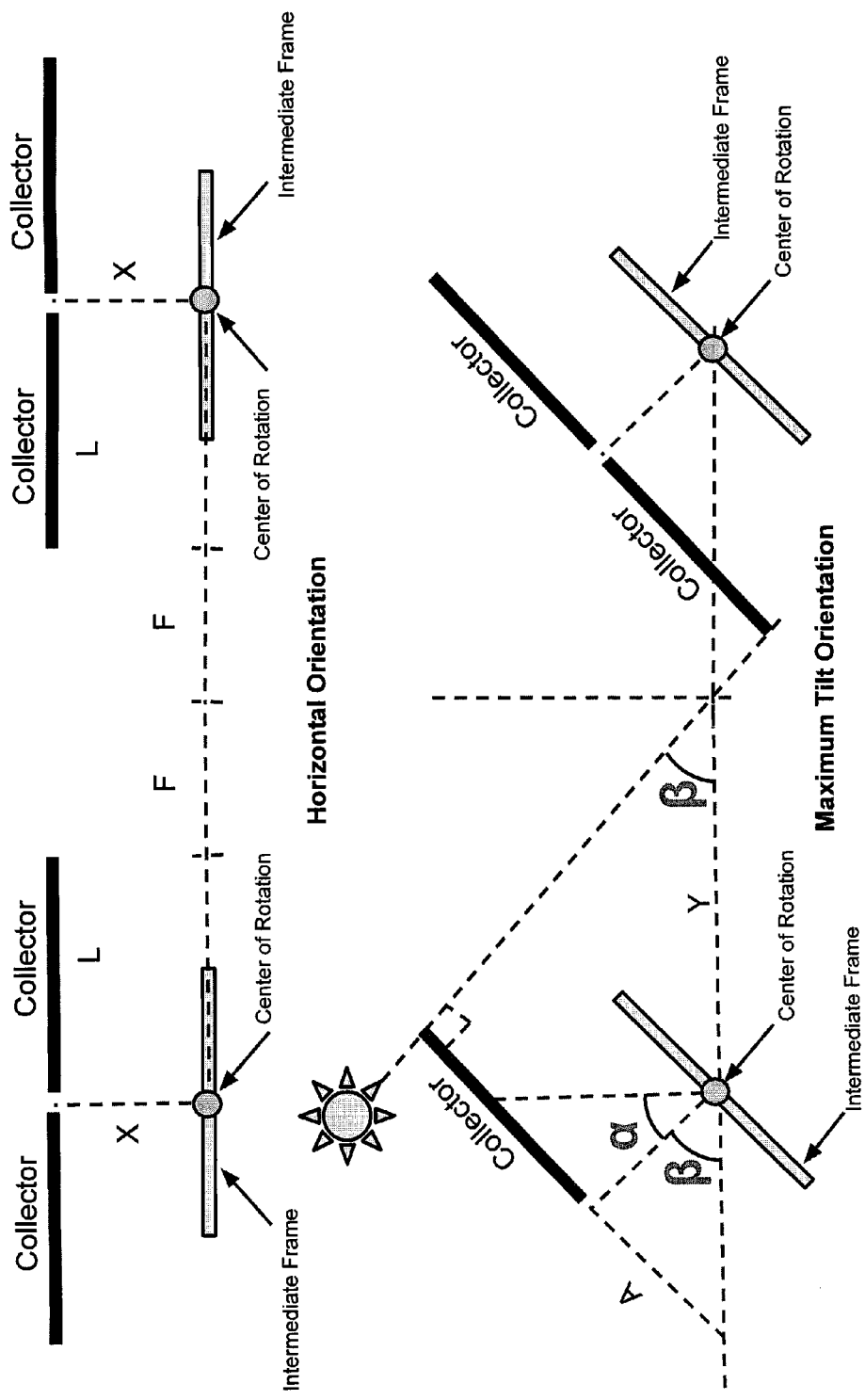
FIG. 14 is a schematic illustration of one example collector panel spacing to avoid shadowing of panels by adjacent panels in a North-South direction.

When multiple intermediate frames are employed such that one or more actuators adjust the tilt angle of the intermediate frames, consideration is preferably given to the separation distance between solar collectors supported by adjacent intermediate frames. This separation distance must be provided so that the solar collectors do not cast shade on one another at the extreme end of their designed range of motion. FIG. 14 represents the angular movement of adjacent intermediate frames (i.e., the North/South tilt angle in FIG. 9). The separation distance (F) is defined as the distance between adjacent solar collector edges for solar collectors supported by different intermediate frames when the solar collectors are in the horizontal position. For the north/south movement, the center of the solar collectors is separated from the center of rotation by some distance X. X is dependent upon the 4 bar linkage dimensions.

α=north range of motion/2

β=90°−α

L=long side length of solar collector (presuming a typically rectangular solar collector panel)·F=(X/tan(α)+L)/sin(β)−x/sin(α)−L FIG. 9 illustrates an extended version of the solar collector positioning apparatus employing a Chebyshev linkage. In FIG. 9, two separate intermediate frame assemblies 4 are positioned on elongated lateral frame members 9B. Each intermediate frame assembly 4 includes a connecting link 33 and extended actuating links 32 are attached at each end to the connecting links 33. An actuator 19 will be attached to at least one of the connecting links 33 and will effectuate the tilt of both intermediate frame assemblies 4. Although not numbered in FIG. 9 for the purposes of clarity, it is readily seen that Chebyshev linkages are also positioned between the intermediate frame assemblies 4 and the collector support frames 6.

Figure 10:
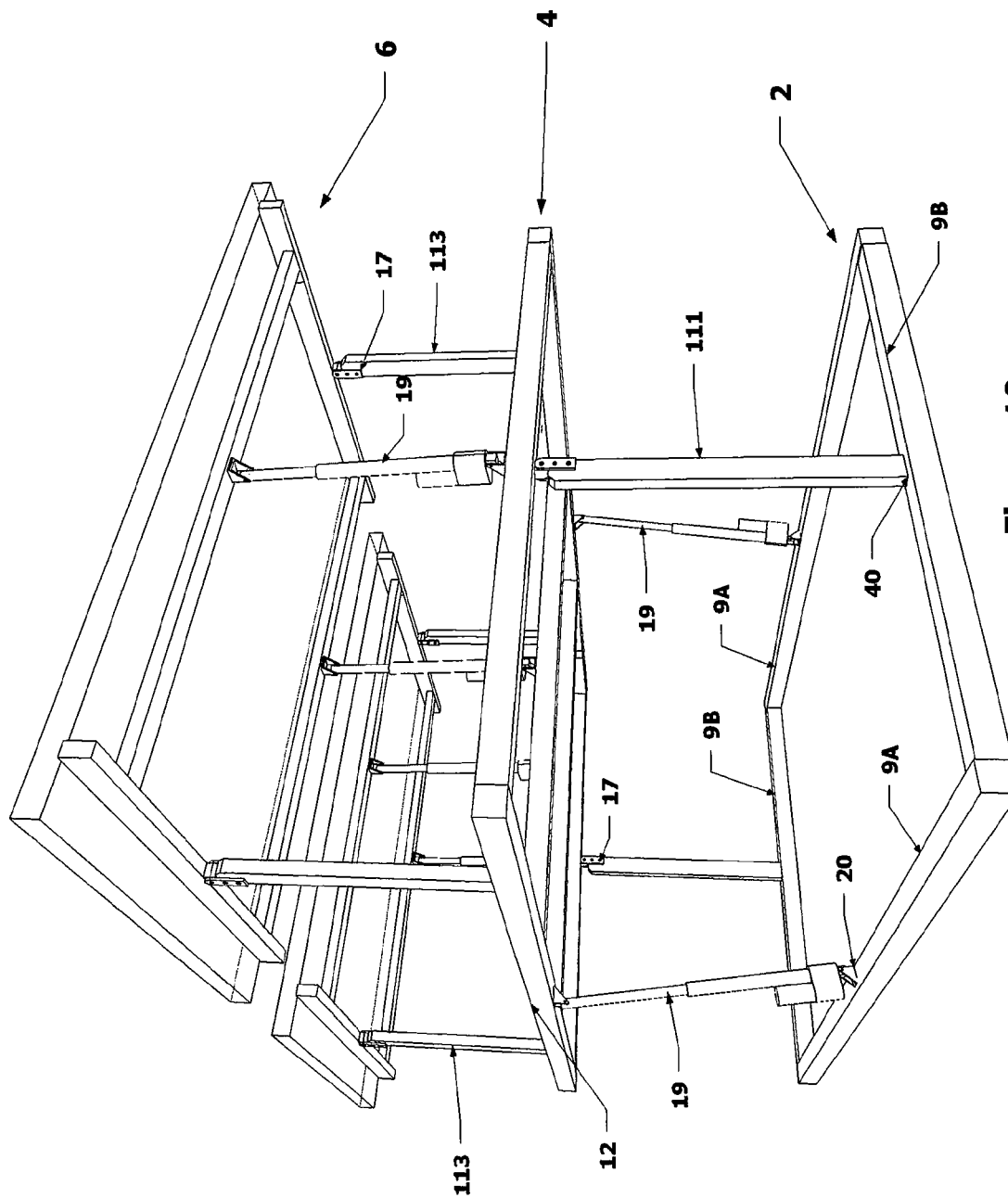
FIG. 10 is a perspective view of a fourth embodiment of the present invention.

FIG. 10 illustrates a still further embodiment of the solar collector positioning apparatus. FIG. 10 differs from FIG. 1 in that the base support legs 111 have their lower ends rigidly fixed to base support frame member 9B by rigid connections 40 (i.e., connections 40 do not allow either rotation or translation of the lower end of support legs 111). However, the upper end of base support legs 111 do have a hinged connection 17 to the frame member 12 of intermediate frame 4. This embodiments shows two linear actuator's 19 positioned on each side of the base support not having a base support leg 111. Again, the embodiment of FIG. 10 employs a virtually identical relationship relative to the intermediate support legs 113 between intermediate frame 4 and collector support frame 6.

Figure 11:
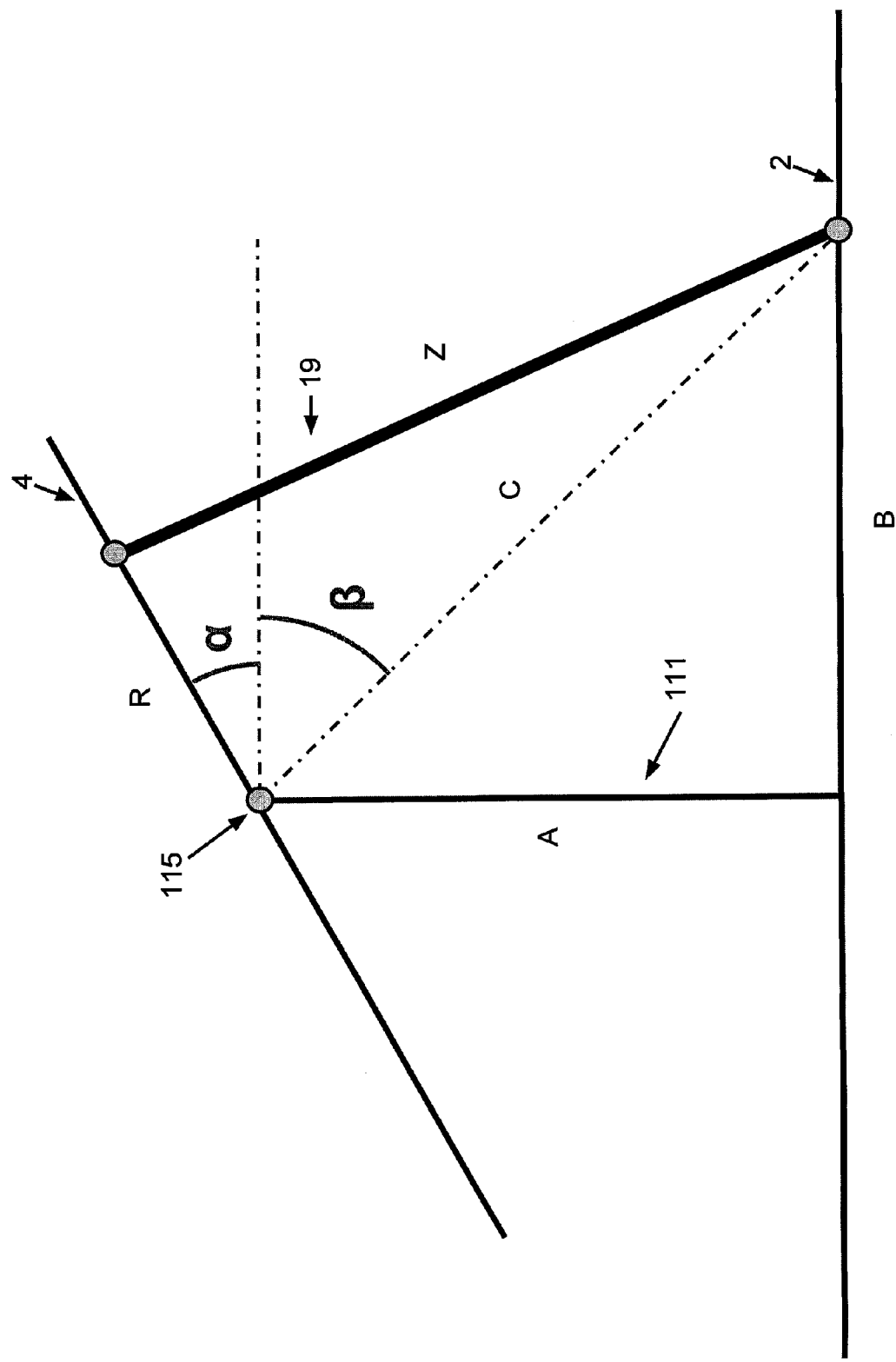
FIG. 11 is a schematic representation of tilt angles in the apparatus of FIG. 10.

FIG. 11 illustrates how the actuator length for a given tilt angle would be calculated for the embodiment of the system shown in FIG. 10. It will be understood that FIG. 11 illustrates a single linear actuator 19 (as opposed to the two actuators 19 seen in FIG. 10). Utilizing sufficiently strong structural members allows use of a single actuator, but the two actuators in FIG. 10 may be a more practical design for common structural materials. In FIG. 11, the actuator 19 is connected at one end to the base support frame 2 at a know distance (B) from the fixed end of the base support leg 111. The other end of the actuator 19 is connected to the intermediate frame 4. The base support leg 111's length is (A) and the desired tilt angle is α. A triangle exists between the point of rotation 115 of the intermediate frame 4, the lower connection point of the actuator 19 and the upper connection point of the actuator 19. The distance between the point of rotation 115 and the lower actuator connection point is represented by C. The distance between the point of rotation 115 and the upper actuator connection point is represented by R. The actuator length is represented by Z. The angle between R and C is the sum of a know angle β and the tilt angle α. For a desired tilt angle, the actuator length is as follows:

$$C = \sqrt{A^2 + B^2}$$

$$\beta = 90° - \tan^{-1}\left(\frac{B}{A}\right)$$

Using the law of cosines:

$$Z^2 = C^2 + R^2 - 2*C*R*\cos(\beta + \alpha)$$

Or $$Z^2 = A^2 + B^2 + R^2 - 2*R*\sqrt{A^2+B^2}*\cos\left(90° - \tan^{-1}\left(\frac{B}{A}\right) + \alpha\right)$$

Figure 12:
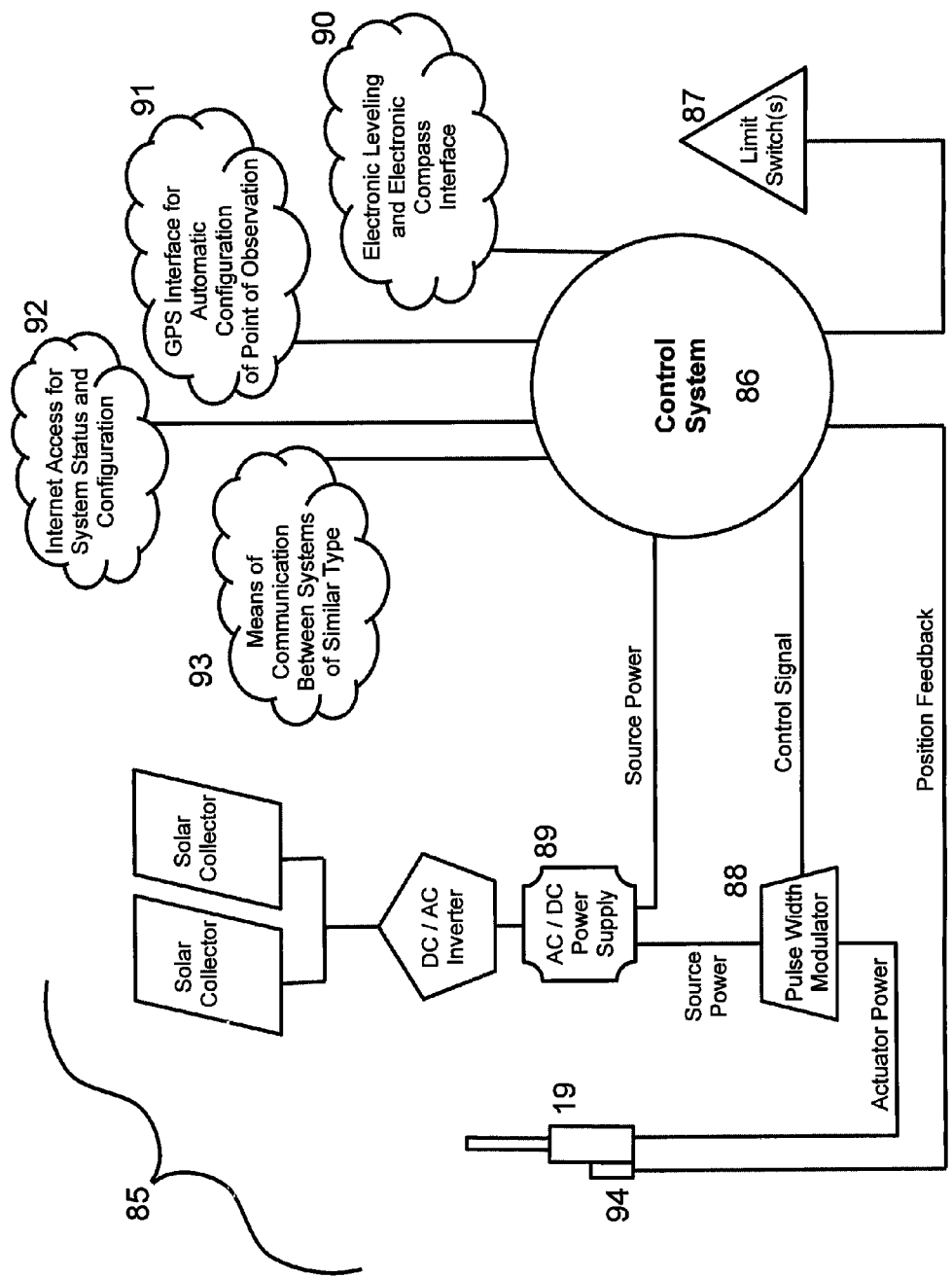
FIG. 12 is a schematic representation of one embodiment of a control system for the apparatuses described herein.

FIG. 12 illustrates one embodiment of a control system 85 for the solar collector positioning devices described above. The control system 85 will be built around a controller 86, which in a preferred embodiment is a computer or at least a central processing unit capable of performing trigonometric and floating point calculations, storing information in volatile and non volatile memory, and interfacing with electrical devices external to the controller. Alternatively, the controller could by a programmable logic controller (PLC) with integral processor, electrical input interface points and electrical output interface points. Alternatively the central processing unit (CPU) could be located remotely from the apparatus and interface to the electrical inputs and outputs located on the apparatus via some communication media. Some examples of this technology would be the use of a cell phone, PDA or other personal programmable device as the controller. In FIG. 12, an AC power supply 89 will take a portion of the power generated by the inverter and convert it into power useable by the control system. One example of the AC power supply 89 will convert 120 VAC output from the inverter into a constant 24 VDC voltage for use by the control system. A 24 VDC battery bank may be incorporated in order to supplement power during periods of low sunlight. The pulse width modulator 88 operates to to control the extension and retraction speed of the actuator. Due to the small incremental changes in the actuator stroke needed to achieve the desired periodic changes in the tilt angles, the actuator is required to move slowly in order to prevent overshoot of the desired position and thereby preventing the acturator from "hunting" (a situation where the actuator extends and retracts repeatedly in order to find the desired position). In the embodiments described above, once the required actuator length is determined for a desired tilt angle, the movement of the actuator is performed. In certain embodiments, the actuator is affixed with a potentiometer 94 as suggested in FIG. 12. The potentiometer's resistance changes linearly as the actuator shaft is extended and retracted. The value of the potentiometer built into the actuator indicates the location of the piston in its stroke. This embodiment calculates the value of the potentiometer for the desired actuator position and hence the desired tilt angle. This is found by:

$$\left(\frac{\text{Desire Stroke Length}}{\text{Maximum Stroke Length}}\right) * \left(\frac{\text{Potentiometer Value Full Extension} -}{\text{Potentiometer Value at Full Retraction}}\right) +$$

$$\text{Potentiometer Value at Full Retraction}$$

The current value of the potentiometer is then compared to the calculated goal and the actuator is either extended or retracted in order to reach its goal. The control system may be calibrated by periodically updating the stored value of the potentiometer at full extension and full retraction. Limit switches 87 may be provided on the system which will be activated at the full travel limits of the system. This embodiment is designed such that the full travel of the actuator equates to the full range of motion of either the module support frame or the intermediate frame. When these limit switches 87 are activated, they indicate to the control system that the value of the potentiometer should be recorded as either the full extension or the full retraction value. In this way, the control system remains calibrated even though outside factors may affect the potentiometer over time.

In this embodiment of control system 85, controller 86 may also be connected to an electronic leveling/compass device 90 for information related to the installation orientation of the apparatus. This allows the control system to compensate for apparatus installations that are either not level or are misaligned with respect to "True" North. The GPS interface 91 provides location information for the Point of Observation described above. Internet interface 92 allows remote access to system status and remote control of the system. Finally, this embodiment of control system 85 could include a communications port 93 allowing for communication or networking with other solar collector positioning systems.

Other than (or in addition to) the specific embodiments described above, many other features and variations are within the scope of the present invention. For example, the photovoltaic modules may be electrically connected to a junction box mounted on the base frame.

The junction box provides a means of electrical interconnection of this apparatus to other apparatus' of the same or similar type. The junction box also provides a means of communication between the control system on this apparatus to a configuration terminal for configuration of site specific parameters, calculation monitoring, and troubleshooting.

The photovoltaic modules may be electrically connected to an inverter mounted on the base frame either directly or through a junction box mounted on the base frame. The inverter provides a means of converting DC power generated by the solar collectors into AC power. This also allows the electrical interconnection of this apparatus to other apparatus' of the same or similar type. It also allows for electrical interconnection of this apparatus to AC lighting panels for direct feed of electrical loads and as a means on interconnection to the utility grid.

The photovoltaic modules may be electrically connected to charge controllers mounted on the base frame either directly or through a junction box mounted on the base frame. The charge controller provides a means of charging batteries for the purpose of storing electrical power.

The support frame for the photovoltaic modules may be provided with a any number of means known in the art for clamping the photovoltaic modules to the apparatus for ease of initial installation of these modules, ease of replacement of these modules, and ease of disassembly of these modules for weather related events. One example of such a clamping means employs a metal bracket, bolt and nut. The bracket is affixed such that a portion of the bracket overlaps the frame of the solar collector module. The bolt passes through the bracket and into the solar collector module support frame. Tightening of the nut or bolt increases the compression force of the bracket on the frame onto the module support frame.

Figure 16:
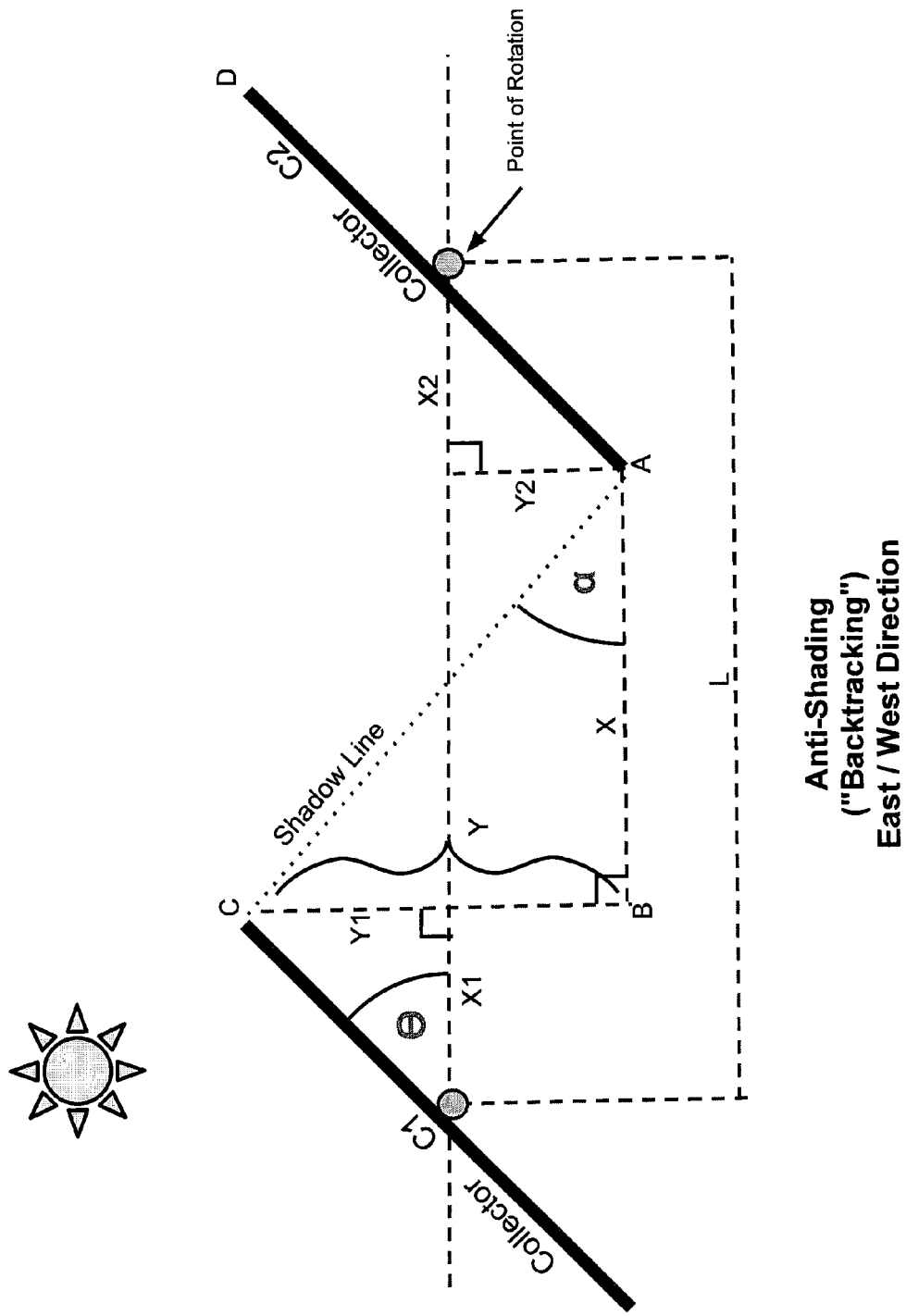
FIG. 16 is a schematic illustration of a "backtracking" function performed by certain embodiments.

In many embodiments, it may be desired to avoid any shadowing caused by one collector panel blocking sun rays reaching an adjacent collector panel, even if that requires the collector panels not remaining perfectly orthogonal to the sun vector. The control system may provide an algorithm which minimizes shading on adjacent modules in the evening by gradually returning the photovoltaic modules to a position parallel to the earth's surface once the limits to the systems range of motion have been reached. Likewise, the control system may provide an algorithm which minimizes shading on adjacent modules in the morning by gradually moving the photovoltaic modules to their range of motion limit where they meet the sun and begin their tracking movement for the day. As an example, the embodiment shown in FIG. 9 may employ an anti-shading routine for morning and evening daylight as depicted in FIG. 16's illustration of collector panels rotating on the collect support frame. In the center of FIG. 16 is a triangle defined by Points A, B, and C. The tilt angle calculated by the control system is Theta. The angle of elevation of the sun above the horizon relative to the plane of motion is Alpha. When the sun is within the range of motion of the tracking system, Theta is equal to (90°−Alpha). However, when the sun moves beyond the range of motion of the tracking system, Theta is less than (90°−Alpha). Under this condition, without correction, collector C1 will cast a shadow on C2. In order to prevent this from occurring, a new tilt angle will be calculated for both C1 and C2 such that the sun ray passing through point C at an angle Alpha will strike collector C2 at point A. The tracking is optimized during "backtracking" if the sun vector passes through points C and A. The sun ray passing through C and intersecting line segment AD causes a shadow on the neighboring collector because the tracking system tilt angle too steep. The sun ray passing through C and intersecting line segment BA causes a loss of power because the tracking system tilt angle is too shallow. So, a change in the elevation angle of the sun outside the range of motion of the tracker should effect a change in the tilt of the panels in order to avoid shading while maintaining the solar collector panels as close as possible to being orthogonal to the sun vector. From FIG. 16, the following backtracking equations apply:

$$Y = y1 + y2$$

$$X = L - x1 - x2$$

$$TAN(Alpha) = (y1+y2)/(L-x1-x2)$$

$$Alpha = 90° - \text{tilt angle (Theta)}$$

Due to the 4-bar linkage supporting the collectors, lengths X and Y are not linear functions of the tilt angle Theta. For this reason, a second order linear regression formuli is derived for Y with respect to Theta and X with respect to Theta. Substituting these formuli into the equation above yields:

$$TAN(Alpha) = [a(Theta2)^2 + b(Theta2) + c]/[e(Theta2)^2 + g(Theta2) + h];$$

where a, b, and c are coefficients of the second order linear equation of Y with respect to Theta and e, g, and h are coefficients of the second order linear equation of X with respect to Theta. Rewriting yields a quadratic equation for a Theta2, a tilt angle which avoids shading. Naturally, those skilled in the art will recognize that all coefficients are based on the geometry of a particular 4-bar linkage design and these coefficients will vary from design to design.

In this embodiment, the control system continually evaluates the desired tilt angle Theta (i.e., the angle which maintains the solar collector orthogonal to the sun vector) against the allowable range of the tilt angle. When the desired tilt angle is less than the allowable range of the tilt angle (i.e., the maximum tilt angle the particular design is mechanically capable of achieving), the system functions as normal because this is the design criteria (as suggested in FIGS. 14 to 16) which avoids shadowing. When the desired tilt angle is greater than the allowable tilt angle, a backtracking tilt angle (Theta2) is calculated from above. It will be understood that the calculations with respect to FIG. 16 illustrates a East/West tilt of the collector frames. The same methodology will be employed to calculate the North/South tilt of the intermediate support frame. Still further embodiments of this system may replace the photovoltaic modules with mirrors for the purpose of reflecting the sun's rays to a point of concentration away from the tracking system. For example, using mirrors allows the device to function as a heliostat in a concentrated solar power (CSP) system. Still further embodiments may include a solar tracking system designed to predict the location of the sun in the sky relative to the point of observation and move the attached solar modules into a position perpendicular to the rays of the sun. The system accomplishes this task by movements in two planes. The first plane of movement is a plane orthogonal to the surface of the earth at the point of observation. The second plane of movement is in a plane orthogonal to the first plane of movement. The combine movements in these two planes result in the desired location of the solar module.

The photovoltaic modules of these embodiments are attached to a support frame. This support frame is attached to an intermediate frame through legs referred to henceforth as support legs. The number of support legs attaching the solar module support frame to the intermediate frame is preferably employed in multiples of two legs. Each support leg has a hinge at both ends. The total number of hinged connections between the solar module support frame and the intermediate frame is a multiple of four. Each solar module support frame can be made to support one or more solar modules. The intermediate frame can be made to support one or more solar module support frames.

The intermediate frame may be attached to a base frame through legs referred to as support legs. The number of support legs attaching the intermediate frame to the base frame is preferably employed in multiples of two legs. Each support leg has a hinge at both ends. The total number of hinged connections between the intermediate frame and the base frame is a multiple of four. The base frame can be made to support one or more intermediate frames. The plane of movement of the intermediate frame(s) is a plane orthogonal to the earth at the point of observation. The point of observation is defined as the point on the surface of the earth where this apparatus is installed. The movement of the intermediate frame is effected by one or more linear actuators. The linear actuator(s) is connected at one end to the base frame. At the other end, the actuator will be connected directly to the intermediate frame or indirectly to the intermediate frame through an arrangement of legs. These legs will be referred to henceforth as actuation legs. The actuation legs are employed in groups of two. Each actuation leg has a hinge at both ends. One end of the actuation leg is attached to the intermediate frame and the other end is attached to a moveable beam henceforth referred to as the actuation beam. In both embodiments the extension and retraction of this actuator effects an associated change in the orientation angle of the intermediate frame.

The next plane of movement is the movement of the solar module support frame(s). The plane of movement of the support frame(s) is orthogonal to and independent of the plane of movement of the intermediate frame. The movement of the support frame(s) is effected by one or more linear actuators. The linear actuator is connected at one end to the intermediate frame. At the other end, the actuator will be connected directly to the support frame or indirectly to the support frame through an arrangement of legs. These legs will be referred to henceforth as actuation legs. The actuation legs are employed in groups of 2. Each actuation leg has a hinge at both ends. One end of the actuation leg is attached to the support frame and the other end is attached to a moveable beam henceforth referred to as the actuation beam. In both embodiments the extension and retraction of this actuator effects an associated change in the orientation angle of the support frame. The extension and retraction of the actuators is effected by signals from a control system. The control system produces these signals as the result of mathematical calculations.

In embodiments where it is desirable to reduce the overall height of the system by operating with a smaller required tilt angle range, and the system is used at a location between 45° N and 45° S latitude, the long side of the collector (assuming a typical rectangular shaped collector) is preferably oriented North/South. Above 45° latitude, the long side of the collector is preferably oriented East/West. However, if the system may be designed without height limitations limiting the tilt angle range, then those skilled in the art will understand that a particular compass orientation is not relevant as long as the control system is provided the actual orientation at which the system is positioned.

While the embodiments described above operate by adjusting the tilt angle of both the intermediate frame and the solar module support frame, other embodiments could operate by the intermediate frame being at a fixed angle relative to the ground plane and only the solar module frame being provided with a tilt angle adjusted by the control system. The angle of the intermediate frame is "fixed" in the sense that it is not automatically adjusted by the control system. Thus, "fixed" could mean constructed at one permanent angle, but "fixed"

call also mean a system where the tilt angle of the intermediate frame may be manually adjusted by a user from time to time.

In this embodiment, the base structure and the intermediate frame may be constructed in virtually any manner that fixes the two structures to prevent relative movement between them. In many examples of this embodiment, the module support frame will be connected to the intermediate frame by at least two intermediate support legs, wherein (i) the number of intermediate support legs is a multiple of two; and (ii) each of the intermediate support legs has a hinged connection to the module support frame and a hinged connection to the intermediate frame. A linear actuator is connected between the intermediate frame and the module support frame to impart rotation to the module support frame relative to the intermediate frame.

Figure 8B:
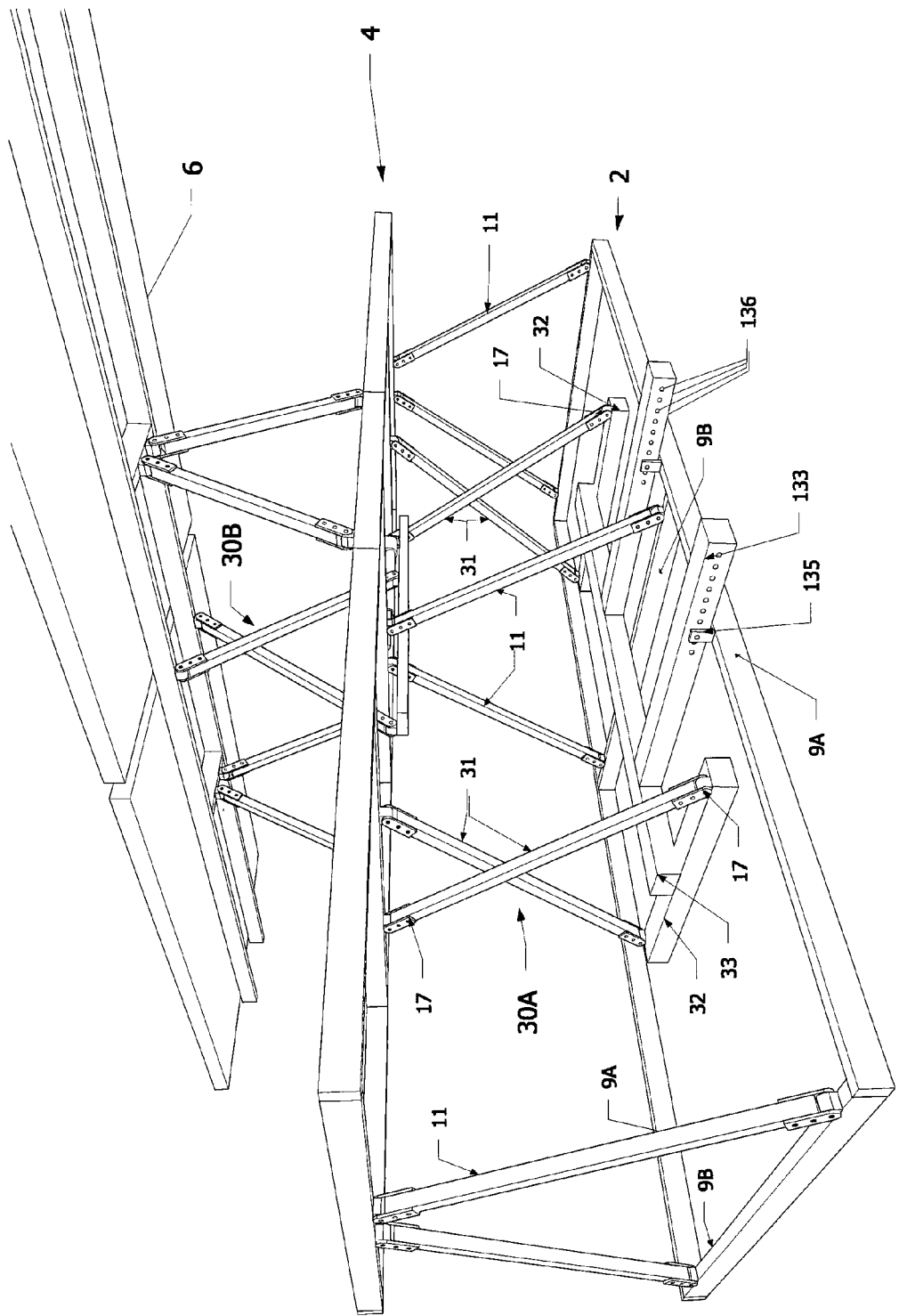
FIG. 8B is one variation to the embodiment of FIG. 8A.

One example of this embodiment is seen in FIG. 8B. Rotation between the base frame 2 and the intermediate frame is fixed by the anchoring links 133 being connected to connecting link 33 at one end and pinned to base frame member 9A at the other end by a pin engaging brackets 135 and pin apertures 136. As suggested in FIG. 8B, anchoring link 135 may be pinned at different positions, thereby fixing connecting link 33 (and the tilt angle of immediate frame 4) in different positions. However, the upper Chebyshev linkage 30B is positioned between the intermediate frame 4 and the collector support frame 6 is operated by a linear actuator which automatically adjusts the tilt angle of collector support frame 6. In FIG. 8B, the intermediate frame 4 is fixed at a North/South tilt angle and the collector support frame 6 moves through a automatically adjusted East/West tilt angle. As used in this specification, a "North/South tilt angle" (or "East/West tilt angle") does not necessarily mean an exact or absolute North/South (East/West) orientation, but includes orientations that are merely predominantly North/South (East/West) in orientation.

Figure 17:
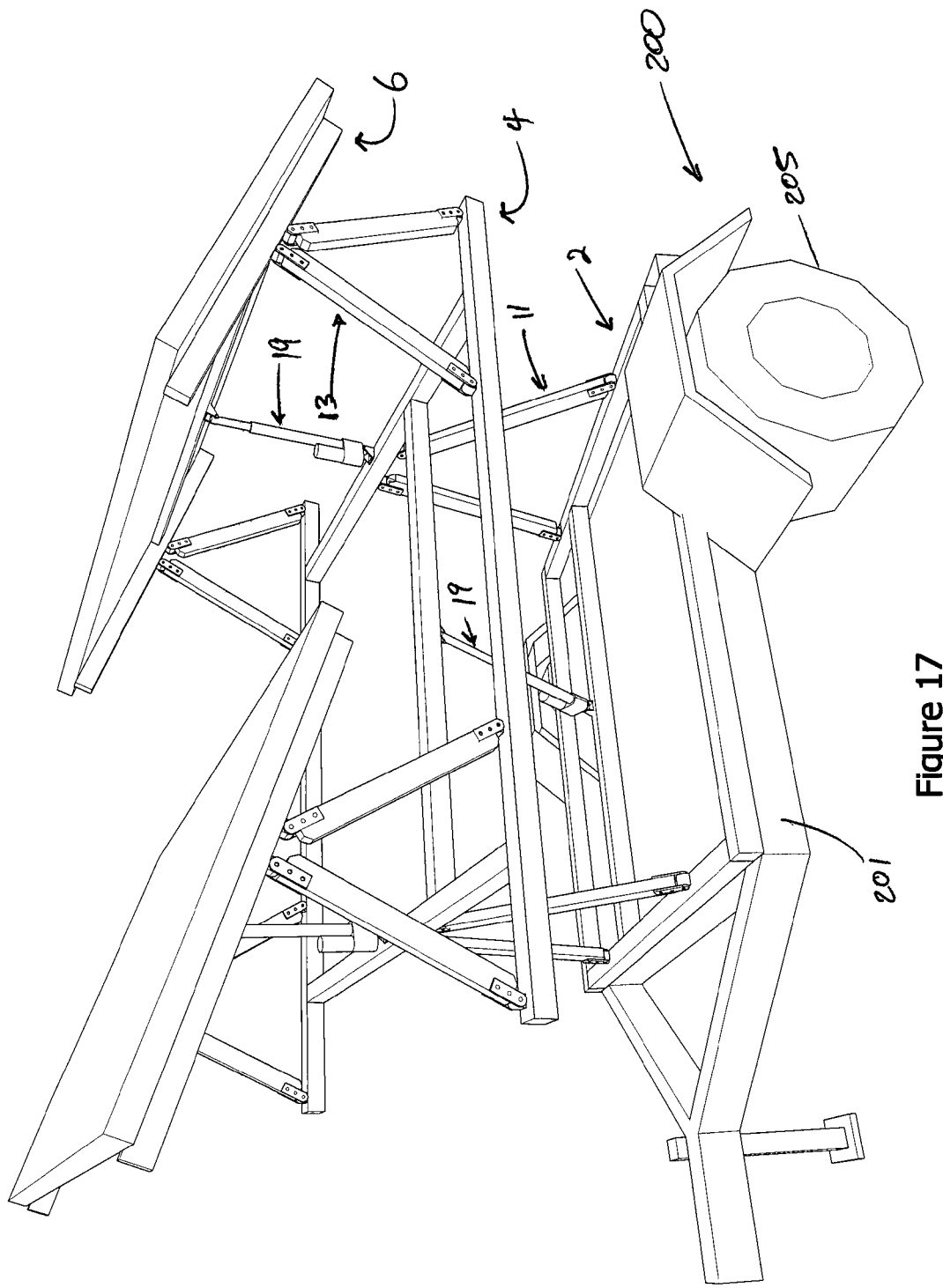
FIG. 17 is a perspective view of one embodiment of the invention mounted on a transport vehicle.

FIG. 17 suggests a still further embodiment of the present invention, transportable solar collector positioning apparatus 200. In the most general terms, the transportable solar collector positioning apparatus 200 will include a wheeled carriage having a carriage frame. In the embodiment of FIG. 17, the wheeled carriage is a conventional two wheeled towed trailer having carriage frame 201 and wheels 205. However, the carriage frame is not limited to towed trailers and could include self-propelled vehicles such as trucks. Likewise, a wheeled carriage is not limited to vehicles with tires, but could include tracked vehicles whose tracks are driven by a series of wheels.

The positioning apparatus seen in FIG. 17 is similar to that of FIG. 1 and includes the base frame 2, intermediate frame 4, and the solar collector support frame 6. In this embodiment, the tilt control structure is the four bar linkage formed by hinged support legs 11 and 13 actuated by the linear actuators 19 as also described in FIG. 1. However, tilt control structures not employing a four bar linkage could be employed in the alternative. Likewise, not all embodiments need to be capable of automatically adjusting the tilt angle in two plans and alternative embodiments could automatically adjust the tilt angle in only a single plane as described in reference to FIG. 8B above.

While not shown in FIG. 17, a control system similar to that seen in FIG. 12 will control the linear actuator(s) in order to impart to the solar collector support frame a tilt angle which maximizes power production based upon a current sun vector. In embodiments where only one tilt angle is automatically adjusted, maximizing power production means adjusting the tilt angle to maintain the collector panel(s) as close to normal to the sun vector as the positioning system can mechanically achieve given only one tilt angle is automatically adjusted. In embodiments where two tilt angles are automatically adjusted, maximizing power production means maintaining the collector panel(s) normal to (or substantially normal to) the sun vector since adjustment of two tilt angles allows much more precise control of the collector panel(s).

This application incorporates by reference herein in its entirety PCT Application Serial No. US2011/061831 filed Nov. 22, 2011.

Although the foregoing description has been in terms of specific embodiments, those skilled in the art will understand that many obvious variations and modifications could be made to these embodiments. For example, further embodiments may include the solar collector apparatus attached to a movable vehicles such as trailer in order provide portability. When a relationship is described between two elements (e.g., a solar collector module being orthogonal to the sun vector), this relationship includes reasonable variations from the precise relationship recited. For example, the solar collector module "being orthogonal" to the sun vector includes being "substantially orthogonal" with modest errors from perfectly orthogonal (e.g., up to 1%, 5%, 10%, 15% or even 20% error in any direction). Likewise, "about" or "approximately" means up to 1%, 5%, 10%, 15% or even 20% error or variation in the quantity given. All such variations and modifications are intended to come within the scope of the following claims.

The invention claimed is:

1. A solar collector positioning apparatus comprising:
 a. a base structure;
 b. an intermediate frame connected to the base structure by at least four base support legs, each of the base support legs having a hinged connection to the base structure and a hinged connection to the intermediate frame, the four support legs having approximately the same length, and the hinged connections to the intermediate frame having a lesser separation distance than the hinged connections to the base structure;
 c. a collector support frame connected to the intermediate frame by at least four intermediate support legs, each of the intermediate support legs having a hinged connection to the collector support frame and a hinged connection to the intermediate frame;
 d. a first linear actuator connected between the base structure and the intermediate frame to impart rotation to the intermediate frame relative to the base frame and a second linear actuator connected between the intermediate frame and the collector support frame to impart rotation to the collector support frame relative to the intermediate frame;
 e. a solar collector module positioned on the collector support frame; and
 f. wherein the movement of the solar collector support frame is constrained to a plane substantially orthogonal to a plane in which movement of the intermediate frame is constrained.

2. The solar collector positioning apparatus of claim 1, wherein the intermediate frame is constrained to movement in a plane substantially orthogonal to a plane occupied by the base structure.

3. The solar collector positioning apparatus of claim 1, wherein a single linear actuator is connected between the base structure and the intermediate frame and a single linear actuator is connected between the intermediate frame and the collector support frame.

4. The solar collector positioning apparatus of claim 1, wherein the first linear actuator is connected to the base support between the hinged connections on the base support and connected to the intermediate frame outside of the hinged connections on the intermediate frame.

5. The solar collector positioning apparatus of claim 4, wherein a control mechanism directs the first linear actuator to impart to the solar collector module a first angle of inclination relative a ground surface plane and the second linear actuator to impart to the solar collector module a second angle of inclination relative to the intermediate frame, such that the solar collector module is substantially orthogonal to a current sun vector.

6. The solar collector positioning apparatus of claim 5, wherein the control mechanism derives angles of inclination by the steps of:
   a. determining a sun vector based upon the date, time of day, a terrestrial point of observation and compass orientation of the positioning apparatus;
   b. resolving the sun vector into its two orthogonal vectors; and
   c. setting the angles of inclination substantially equal to the angles between the orthogonal vectors and the ground surface plane.

7. The solar collector positioning apparatus of claim 6, wherein the sun vector is represented by the components ($S_x$, $S_y$, $S_z$) and the first angle of inclination is a North tilt angle equal to $\tan^{-1}(-S_y/S_z)$ and the second angle of inclination is an East tilt angle equal to $\tan^{-1}(-S_x/S_z)$.

8. The solar collector positioning apparatus of claim 6, wherein the sun vector is represented in Cartesian coordinates ($S_x$, $S_y$, $S_z$).

9. The solar collector positioning apparatus of claim 1, wherein the first linear actuator is connected between the base structure and the intermediate frame by way of a linkage which translates linear actuator extension within a plane parallel to a ground surface plane into rotation of the intermediate frame.

10. The solar collector positioning apparatus of claim 9, wherein the linkage is a Chebyshev linkage.

11. The solar collector positioning apparatus of claim 1, wherein the number of base support legs are a multiple of two and the number of intermediate support legs are a multiple of two.

12. The solar collector positioning apparatus of claim 9, wherein a control system periodically calculates the angles of inclination and adjusts the linear actuators to maintain the solar collector module normal to the current sun vector.

13. A solar collector positioning apparatus comprising:
   a. a base structure;
   b. an intermediate frame connected to the base structure by at least two base support legs, each of the base support legs having a connection to the base structure and a hinged connection to the intermediate frame, the at least two support legs having approximately the same length;
   c. a solar collector support frame connected to the intermediate frame by at least two intermediate support legs, each of the intermediate support legs having a hinged connection to the solar collector support frame and a connection to the intermediate frame;
   d. a first linear actuator connected between the base structure and the intermediate frame by way of a Chebyshev linkage in order to impart rotation to the intermediate frame relative to the ground surface plane, and a second linear actuator connected between the intermediate frame and the collector support frame to impart rotation to the collector support frame relative to the intermediate frame;
   e. a solar collector module positioned on the collector support frame; and
   f. wherein the movement of the solar collector support frame is constrained to a plane substantially orthogonal to a plane in which movement of the intermediate frame is constrained.

14. The solar collector positioning apparatus of claim 13, wherein the connections between (i) the base support legs and the base structure, and (ii) the intermediate support legs and the intermediate frame, are both fixed connections.

15. The solar collector positioning apparatus of claim 13, further comprising two linear actuators positioned on opposing sides of the base support structure and two linear actuators positioned on opposing sides of the intermediate structure.

16. A solar collector positioning apparatus comprising:
   a. a base structure;
   b. an intermediate frame connected to the base structure by at least two base support legs, each of the base support legs having a hinged connection to the base structure and a hinged connection to the intermediate frame, thereby constraining the movement of the intermediate frame to a plane substantially orthogonal to a plane occupied by the base structure; and
   c. a solar collector support frame connected to the intermediate frame by at least two intermediate support legs, each of the intermediate support legs having a hinged connection to the solar collector support frame and a hinged connection to the intermediate frame, thereby constraining the movement of the solar collector support frame to a plane substantially orthogonal to a plane in which movement of the intermediate frame is constrained.

17. The solar collector positioning apparatus of claim 16, wherein a first linear actuator causes rotation of the intermediate frame relative to the base frame and a second linear actuator causes rotation of the solar collector support frame relative to the intermediate frame.

18. The solar collector positioning apparatus of claim 17, further comprising at least one linear actuator causing rotation of the intermediate frame relative to the base frame and at least one linear actuator causing rotation of the solar collector support frame relative to the intermediate frame.

19. The solar collector positioning apparatus of claim 17, further comprising at least four base support legs and at least four intermediate support legs.

20. The solar collector positioning apparatus of claim 19, wherein the four base support legs have approximately the same length and the four intermediate support legs have approximately the same length.

21. The solar collector positioning apparatus of claim 16, wherein the base structure comprises a frame of connected linear members.

22. The solar collector positioning apparatus of claim 16, further comprising a solar collector module which is one of either (i) a photovoltaic module, (ii) a solar water heater module, (iii) a solar thermal evaporator, (iv) a solar thermal condenser, or (v) a mirror.

* * * * *